US011066075B2

(12) United States Patent
Woo

(10) Patent No.: US 11,066,075 B2
(45) Date of Patent: Jul. 20, 2021

(54) APPARATUS AND METHOD FOR CONTROLLING A VEHICLE BASED ON A DETECTED OBJECT

(71) Applicant: Mando Corporation, Pyeongtaek-si (KR)

(72) Inventor: Hyeong Min Woo, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 65 days.

(21) Appl. No.: 16/288,325

(22) Filed: Feb. 28, 2019

(65) Prior Publication Data

US 2019/0270455 A1    Sep. 5, 2019

(30) Foreign Application Priority Data

Mar. 2, 2018 (KR) .................. 10-2018-0025016

(51) Int. Cl.
| | | |
|---|---|---|
| *B60W 40/04* | (2006.01) | |
| *B60W 30/08* | (2012.01) | |
| *B60W 50/14* | (2020.01) | |
| *G08G 1/16* | (2006.01) | |
| *G01S 13/931* | (2020.01) | |
| *G01S 15/931* | (2020.01) | |

(52) U.S. Cl.
CPC ............ *B60W 40/04* (2013.01); *B60W 30/08* (2013.01); *B60W 50/14* (2013.01); *B60W 2420/52* (2013.01); *B60W 2420/54* (2013.01); *B60W 2554/00* (2020.02)

(58) Field of Classification Search
CPC ........................................................ G08G 1/16
See application file for complete search history.

(56) References Cited

U.S. PATENT DOCUMENTS

| | | | | |
|---|---|---|---|---|
| 2015/0097704 A1* | 4/2015 | Kwon | .................. | G01S 15/878 340/932.2 |
| 2017/0227640 A1* | 8/2017 | Nomura | .................. | G01S 15/93 |
| 2018/0032086 A1* | 2/2018 | Punithan | .............. | G05D 1/0293 |
| 2018/0088230 A1* | 3/2018 | Hung | ...................... | G01S 13/08 |
| 2018/0323783 A1* | 11/2018 | Bang | ...................... | G06F 3/043 |

FOREIGN PATENT DOCUMENTS

| | | |
|---|---|---|
| JP | 2016-80648 A | 5/2016 |
| JP | 2016-85043 A | 5/2016 |
| JP | 2016-191617 A | 11/2016 |

(Continued)

OTHER PUBLICATIONS

Korean Office Action dated Jul. 5, 2019 issued in Korean Patent Application No. 10-2018-0025016.

*Primary Examiner* — Joseph H Feild
*Assistant Examiner* — Pameshanand Mahase
(74) *Attorney, Agent, or Firm* — Morgan, Lewis & Bockius LLP

(57) ABSTRACT

Disclosed are an apparatus and a method for controlling a vehicle based on a detected object. The apparatus may detect an object through a plurality of ultrasonic sensors, and directly and indirectly detect the object through the plurality of ultrasonic sensors by a controller and if at least one of a direct distance value and an indirect distance value from the object is equal to or smaller than a preset distance determination reference value, determine that the object exists in a short-range area.

20 Claims, 17 Drawing Sheets

(56) References Cited

FOREIGN PATENT DOCUMENTS

| | | |
|---|---|---|
| JP | 2017-207393 A | 11/2017 |
| KR | 2000-0062430 A | 10/2000 |
| KR | 10-2013-0010716 A | 1/2013 |
| KR | 10-2014-0129590 A | 11/2014 |
| KR | 10-2015-0041307 A | 4/2015 |
| KR | 10-2016-0015752 A | 2/2016 |

* cited by examiner

APPARATUS AND METHOD FOR CONTROLLING A VEHICLE BASED ON A DETECTED OBJECT

CROSS REFERENCE TO RELATED APPLICATION

This application claims priority from Korean Patent Application No. 10-2018-0025016, filed on Mar. 2, 2018, which is hereby incorporated by reference for all purposes as if fully set forth herein.

BACKGROUND OF THE INVENTION

1. Field of the Invention

The present disclosure relates to an apparatus for controlling a vehicle based on a detected object, and more particular to an apparatus and a method for controlling a vehicle based on an object detected by a sensor including an ultrasound sensor, a radar sensor.

2. Description of the Prior Art

In general, an apparatus for detecting an object is determining the object by monitoring the object located in a space. Recently, research on the apparatus for detecting the object using an ultrasonic sensor has been actively conducted.

The apparatus for detecting the object using the ultrasonic sensor may transmit an ultrasonic signal and also receive an ultrasonic signal reflected from the object through the ultrasonic sensor and detect the object on the basis of the ultrasonic signal.

However, when detecting an object existing in a near field, the apparatus for detecting the object using the ultrasonic sensor may mis-detect the object due to a characteristic of the ultrasonic sensor.

SUMMARY OF THE INVENTION

The present embodiments have been made to solve the above problem, and an aspect of the present embodiments is to provide an apparatus for controlling a vehicle based on a detected object which can improve the object detection accuracy in a short-range area and also in a long-range area.

Another aspect of the present embodiments is to provide a method for controlling a vehicle based on a detected object which can improve the object detection accuracy in a short-range area and also in a long-range area.

In accordance with an aspect of the present disclosure, an apparatus for controlling a vehicle based on a detected object is provided. The apparatus includes: a plurality of sensors mounted to a vehicle to have a field of view of an exterior of the vehicle and a controller communicatively connected to the plurality of sensors and configured to: recognize a type of a sensing data comprising at least one piece of direct sensing data and indirect sensing data from a processing result of the sensing data, compare a distance value acquired by the processing result of the sensing data of which the type is recognized with a preset distance determination reference value, determine whether there is a object located in a particular area according to a comparison result, search a parking area around the vehicle according to a determination result and perform control of the vehicle based on searched the parking area.

In accordance with another aspect of the present disclosure, a method for controlling a vehicle based on a detected object. The method includes: capturing sensing data and processing the captured sensing data by a plurality of sensors mounted to a vehicle to have a field of view of an exterior of the vehicle, recognizing a type of the sensing data comprising at least one piece of direct sensing data and indirect sensing data from a processing result of the sensing data, comparing a distance value acquired by the processing result of the sensing data of which the type is recognized with a preset distance determination reference value, determining whether there is a object located in a particular area according to a comparison result, searching a parking area around the vehicle according to a determination result and performing control regarding a behavior of a control of the vehicle based on searched the parking area.

According to the apparatus for controlling a vehicle based on detected the object according to the present embodiments described above, there is an effect of improving accuracy of object sensing in the short-range area by distinguishing between the direct detecting and indirect detecting for the object actually existing in the short-range area and mis-detecting due to structure reflection and noise.

According to the apparatus for controlling a vehicle based on detected the object according to the present embodiments, there is an effect of improving accuracy of object detecting in the long-range area by detecting the object in the long-range area through indirect detecting of the object.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1A:
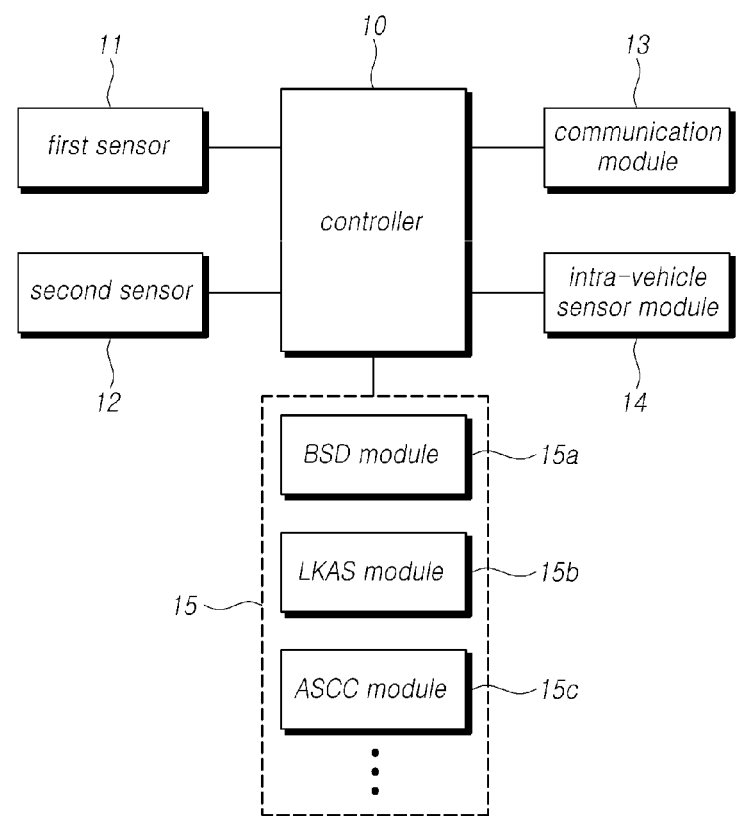
FIG. 1A is a block diagram illustrating a vehicle according to an embodiment of the present embodiments.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements. The expression "and/or" includes any or all combinations of items enumerated together.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Unless defined otherwise, all terms as used herein (including technical terms and scientific terms) have the same meaning as commonly understood by a person of ordinary skill in the art to which the present disclosure pertains. Such terms as those defined in a generally used dictionary are not to be interpreted to have ideal or excessively meanings unless clearly defined in the present disclosure.

In the following description of the embodiments of the present disclosure, a detailed description of known functions and configurations incorporated herein will be omitted when it may make the subject matter of the present disclosure unclear. Meanwhile, terms described later are defined in consideration of the functions of the present disclosure, but the meaning of the terms may be changed according to a user, intention of an operator, or convention. Therefore, the definitions of the terms should be made based on the contents throughout the specification.

A vehicle in this specification may be a concept including a car, a motorcycle, and the like. Further, the vehicle may be a concept including all of an internal combustion engine car having an engine as a power source, a hybrid car including an engine and an electric motor as a power source, and an electric car including an electric motor as a power source. Hereinafter, a car will be representatively described for the vehicle.

In the following description, "front" means a forward driving direction of the vehicle and "rear" means a backward driving direction of the vehicle. Further, "left" of the vehicle means the left when facing the forward driving direction and "right" of the vehicle means the right when facing the forward driving direction. In addition, "rear-side" of the vehicle means the left or the right when facing the backward driving direction of the vehicle.

Hereinafter, an apparatus for controlling a vehicle based on a detected object will be described with reference to the accompanying drawings.

FIG. 1A is a block diagram illustrating a vehicle according to an embodiment of the present embodiments.

Referring to FIG. 1A, the vehicle may include a controller 10, first sensor 11, second sensor 12, a communication module 13, an intra-vehicle sensor module 14 a driver assistance system module 15.

For example, the first sensor 11 may include an image sensor configured to have a field of view of an interior or an exterior of the vehicle and capture image data and a processor configured to the captured image data.

For example, the image sensor may be mounted to the vehicle to have a field of view of an an exterior of the vehicle. At least one image sensor may be mounted to each part of the vehicle to have a field of view of the front, side, or rear of the vehicle.

Wherein the image sensor may include in, for example, camera, LiDAR sensor.

Information on an image photographed by the image sensor consists of image data and thus may refer to image data captured by the image sensor. Hereinafter, the information on the image photographed by the image sensor may refer to image data captured by the image sensor in the present embodiment. The image data captured by the image sensor may be generated, for example, in one format of AVI, MPEG-4, H.264, DivX, and JPEG in a raw form.

The image data captured by the image sensor may be processed by a processor. The processor may operate to process the image data captured by the image sensor.

The processor may implemented using at least one of electrical units for processing image data and performing other functions, such as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, micro-controllers, micro-processors, in hardware.

Meanwhile, the second sensor 12 is a sensor module other than the first sensor 11 for capturing an image. For example, a plurality of second sensors 12 may be mounted to the vehicle to have a field of view of an interior or an exterior of the vehicle and configured to capture sensing data. The plurality of second sensors 12 may include, for example, radar sensors and ultrasonic sensors. The second sensors 12 may be omitted or the number thereof may be one or more.

The communication module 13 performs a function of performing communication between vehicles, communication between a vehicle and infrastructure, communication between a vehicle and a server, and communication inside a vehicle. To this end, the communication module 13 may consist of a transmission module and a reception module. For example, the communication module 13 may include a broadcast reception module, a wireless Internet module, a short-range communication module, a location information module, an optical communication module, and a V2X communication module.

The broadcast reception module receives broadcast signals and/or broadcast-related information from external broadcast management servers through broadcasting channels. Here, the broadcast includes at least one of a radio broadcast and a TV broadcast. The wireless Internet module may be a module for wireless Internet access and may be mounted inside or outside the vehicle. The short-range communication module is for short-range communication and may support short-range communication through at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, and wireless Universal Serial Bus (USB).

The location information module is a module for acquiring location information of the vehicle and representatively includes a Global Positioning System (GPS) module. For example, through the use of the GPS module, the vehicle may acquire a location thereof using a signal transmitted from a GPS satellite. Meanwhile, according to an embodiment, the location information module may be an element included in the intra-vehicle sensor module 14 rather than an element included in the communication module 13.

The optical module may include an optical transmitter and an optical receiver. The optical transmitter and the optical receiver may convert a light signal into an electric signal to transmit/receive information.

The V2X communication module is a module for wireless communication with a server, another vehicle, or an infrastructure device. The V2X communication module according to the present embodiment means an exchange of information between the vehicle and objects, such as another vehicle, a module device, and a road, through a wired/wireless network, or technology itself therefor. The V2X communication module may include concepts of Vehicle to Vehicle (V2V), Vehicle to Infrastructure (V2I), Vehicle to Nomadic Device (V2N), and Vehicle to Pedestrian (V2P). The V2X communication module is based on Dedicated Short-Range Communications (DSRC), and may use Wireless Access in Vehicular Environment (WAVE), recently developed by IEEE or IEEE 802.11p communication technology, using a 5.9 GHz band, but is not limited thereto but is not limited thereto. It should be understood that V2X communication includes any communication between vehicles that does not exist at present but is to be developed in the future.

The intra-vehicle sensor module 14 of the vehicle is a sensor for sensing internal information of the vehicle. For example, the intra-vehicle sensor module 14 may be a torque sensor for sensing a steering torque, a steering angle sensor for sensing a steering angle, a motor location sensor for sensing information on a steering motor, a vehicle speed sensor, a vehicle motion detection sensor for sensing motion of the vehicle, and a vehicle position detection sensor. Besides, the intra-vehicle sensor module 14 may be a sensor for sensing various pieces of data inside the vehicle and the number of thereof may be one or more.

The controller 10 may be connected communicatively to the first sensor 11, the second sensor 12, the communication module 13, the intra-vehicle sensor module 14 and the driver assistance system module 15.

The controller 10 may acquire data from at least one of the first sensor 11, the second sensor 12, the communication module 13, and the intra-vehicle sensor module 14 and control various operations of the vehicle on the basis of the acquired data. Alternatively, the controller 10 may acquire image data from the first sensor 11 and process the image data. Further, the controller 10 may receive sensing data from the second sensor 12 and process the sensing data. Alternatively, the controller 10 may acquire data from the intra-vehicle sensor module 14 or the communication module 13 and process the data. For such processing, the controller 10 may include at least one processor.

Meanwhile, the controller 10 may recognize the type of sensing data based on processing of the sensing data, determine whether there is an object located in a particular area based on a distance value corresponding to the recognized sensing data and perform control of the vehicle.

Specifically, the controller 10 may recognize a type of a sensing data comprising at least one piece of direct sensing data and indirect sensing data from a processing result of the sensing data, compare a distance value acquired by the processing result of the sensing data of which the type is recognized with a preset distance determination reference value, determine whether there is a object located in a particular area according to a comparison result, search a parking area around the vehicle according to a determination result and perform control of the vehicle based on searched the parking area.

The type of sensing data may include direct sensing data, which is sensing data directly captured by transmitting a transmission signal and receiving a reception signal corresponding to the transmitted transmission signal by one of the plurality of second sensors 12, and indirect sensing data, which is sensing data indirectly captured by receiving a transmission signal transmitted by one of the plurality of second sensors 12 by another sensor.

For example, if the second sensor 12 is an ultrasonic sensor, the type of sensing data is direct sensing data or a direct ultrasonic reception signal if an object is detected through one ultrasonic sensor having performed both transmission and reception of an ultrasonic signal, and the type of sensing data is indirect sensing data or an indirect ultrasonic reception signal if an object is detected through different ultrasonic sensors having performed transmission and reception of an ultrasonic signal, respectively.

In another example, if the second sensor 12 is a radar sensor, the type of sensing data is direct sensing data or a radar direct reception signal if an object is detected through one radar sensor having performed both transmission and reception of a radar signal, and the type of sensing data is indirect sensing data or an indirect ultrasonic reception signal if an object is detected through different radar sensors having performed transmission and reception of a radar signal, respectively.

The sensing data captured by the plurality of second sensors 12 may include the types of sensing data, that is, the direct sensing data and the indirect sensing data.

Meanwhile, according to the above described, the object may be determined to be directly detected or indirectly detected by the controller 10 according to the type of sensing data. That is, the controller 10 may recognize the type of sensing data based on a transmission signal transmitted from and a reception signal received from the second sensor 12 and determine at least one of direct detecting and indirect detecting of the object according to the type of sensing data.

The distance value may be acquired by the processing result of the sensing data. Specifically, a direct distance value may be acquired by the processing result of sensing data including direct sensing data, an indirect distance value may be acquired by the processing result of sensing data including indirect sensing data, and both a direct distance value and an indirect distance value may be acquired by the processing result of sensing data including both direct sensing data and indirect sensing data.

The particular area may include a short-range area and a long-range area. The short-range area and the long-range area may be distinguished by a preset distance determination reference value. However, they are not limited thereto and may be distinguished by a design method.

The preset distance determination reference value is a distance value for distinguishing the short-range area and the long-range area, and may be set as one value but is not limited thereto. The number of preset distance determination reference values may be plural.

According to an embodiment, the controller 10 may recognize direct sensing data and indirect sensing data and, if at least one of the direct distance value acquired by the processing result of the direct sensing data and the indirect distance value acquired by the processing result of the indirect sensing data is equal to or smaller than the distance determination reference value, determine that the object exists in the short-range area.

According to another embodiment, the controller 10 may recognize direct sensing data and indirect sensing data and, if at least one of the direct distance value acquired by the processing result of the direct sensing data and the indirect distance value acquired by the processing result of the indirect sensing data is larger than the distance determination reference value, determine that the object exists in the long-range area.

According to yet another embodiment, the controller 10 may recognize at least one piece of direct sensing data and indirect sensing data and, if the distance value acquired by the processing result of the at least one piece of the direct sensing data and the indirect sensing data is equal to or smaller than the distance determination reference value, determine that the object does not exist.

According to yet another embodiment, the controller 10 may recognize at least one piece of direct sensing data and indirect sensing data and, if the distance value acquired by the processing result of the at least one piece of the direct sensing data and the indirect sensing data is larger than the distance determination reference value, determine that the object exists in the long-range area.

In addition, the controller 10 may control the operation of at least one of the first sensor 11, the second sensor 12, the communication module 13, and the intra-vehicle sensor module 14. The controller 10 may control the operation of various driver assistance systems installed in the vehicle.

Meanwhile, the controller 10 may operate to control one or more of various driver assistance systems (DAS) used by the vehicle. For example, the controller 10 may determine a particular situation, a condition, event generation, and control operation performance based on data acquired from at least one of the modules 11, 12, 13 and 14.

The controller 10 may transmit a signal for controlling the operation of the various driver assistance system modules 15 included in the vehicle based on determined information.

For example, the driver assistance system modules 15 may include a blind spot detection (BSD) system module, a lane keeping assist system (LKAS) module, an adaptive smart cruise control (ASCC) system module, and a smart parking assist system (SPAS) module.

In addition, the driver assistance system modules 15 included in the vehicle may be one of various systems, such as a lane departure warning system (LDWS), a lane change assist system (LCAS), a smart parking assist system (SPAS).

The terms and names of the driver assistance systems described herein are only for examples and are not limited thereto. The driver assistance system modules 15 may include an autonomous driving module for autonomous driving. Alternatively, by controlling individual system modules included in the driver assistance system modules 15, the controller 10 may control the vehicle to perform autonomous driving.

For example, if the driver assistance system modules 15 is configured to control movement of the vehicle such that the smart vehicle assist system searches for a parking lot around the vehicle and parks the vehicle into the parking lot or takes the vehicle output of the parking lot, the controller 10 may recognize the type of sensing data including at least one piece of direct sensing data and indirect sensing data from the processing result of sensing data, compare a distance value acquired by the processing result of the sensing data of which the type has been recognized with a preset distance determination reference value, and determine whether there is an object located in a particular area according to the comparison result.

The apparatus for controlling the vehicle based on detected the object according to the present embodiment may be configured as a combination of the above-described elements as necessary. For example, the apparatus for controlling the vehicle based on detected the object according to an embodiment of the present embodiments may include the first sensor 11, the second sensor 12, and the controller 10, and the apparatus for controlling the vehicle based on detected the object according to another embodiment may include the second sensor 12 and the controller 10. However, the present disclosure is not limited thereto.

Accordingly, the following description will be made based on the apparatus for controlling the vehicle based on detected the object including the second sensor 12 and the controller 10 for convenience of description, but is not limited thereto and the apparatus for controlling the vehicle based on detected the object according to the present embodiment can perform all operations according to the present embodiment although the apparatus further include a combination of the first sensor 11, the communication module 13, and the intra-vehicle sensor module 14.

Meanwhile, the second sensor 12 may include the ultrasonic sensor and the radar sensor as described above and the following description will be made based on the case in which the second sensor 12 is the ultrasonic sensor for convenience description. However, it is apparent that the radar sensor may be applied to the present embodiments instead of the ultrasonic sensor.

The apparatus for controlling the vehicle based on detected the object according to the present embodiment may be configured as a combination of the above-described elements as necessary. For example, the apparatus for controlling the vehicle based on detected the object according to an embodiment of the present embodiments may include the first sensor 11, the second sensor 12, and the controller 10, and the apparatus for controlling the vehicle based on detected the object according to another embodiment may include the second sensor 12 and the controller 10. However, the present disclosure is not limited thereto.

Figure 1B:
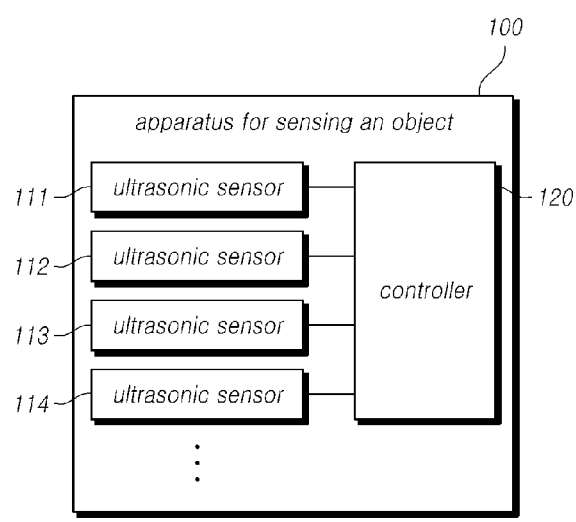
FIG. 1B is block diagram overall illustrating the apparatus for controlling the vehicle based on detected the object according to the present embodiments.

FIG. 1B is block diagram overall illustrating the apparatus for controlling the vehicle based on detected the object according to the present embodiments.

Referring to FIG. 1C, the apparatus 100 for controlling the vehicle based on detected the object according to the present embodiments may include a plurality of ultrasonic sensors 111, 112, 113, and 114, and a controller 120.

The plurality of second sensors 12 may include a plurality of ultrasonic sensors, each of which transmits an ultrasonic signal and receives an ultrasonic signal reflected from an object.

The number of ultrasonic sensors may be plural. The plurality of ultrasonic sensors 111, 112, 113, and 114 may detect the object.

The controller 120 may directly and indirectly detect the object through the plurality of ultrasonic sensors 111, 112, 113, and 114, and if at least one of a direct distance value and an indirect distance value from the object is equal to or smaller than a preset distance determination reference value, determine that the object exists in a short-range area.

The controller 120 may directly and indirectly detect the object through the plurality of ultrasonic sensors 111, 112, 113, and 114, and if both a direct distance value and an indirect distance value from the object are larger than a preset distance determination reference value, determine that the object exists in a long-range area.

The controller 120 may directly and indirectly detect the object through the plurality of ultrasonic sensors 111, 112, 113, and 114, and if both a direct distance value and an indirect distance value from the object are equal to or smaller than a preset distance determination reference value, determine that there is no object in a short-range area.

The controller 120 may directly and indirectly detect the object through the plurality of ultrasonic sensors 111, 112, 113, and 114, and if a direct distance value or an indirect distance value from the object is larger than a preset distance determination reference value, determine that the object exists in a long-range area.

In a detailed description with reference to FIG. 1, each of the plurality of ultrasonic sensors 111, 112, 113, and 114 may transmit an ultrasonic signal. That is, the ultrasonic sensors may operate as transmitters for transmitting ultrasonic signals.

The plurality of ultrasonic sensors 111, 112, 113, and 114 may receive ultrasonic signals reflected from the object. That is, the ultrasonic sensors may operate as receivers for receiving ultrasonic signals reflected from the object.

The object is an object, that is, a thing located in a particular space which can be detected by the ultrasonic sensors, and may include everything having a state or behavior. Particularly, the thing may include a moving thing and/or a non-moving thing. The moving thing may include a person. Meanwhile, if the ultrasonic sensors are mounted to the vehicle, the object may be an object outside the vehicle. The plurality of second sensors 12 may include first to fourth ultrasonic sensors, each of which transmits an ultrasonic signal and receives an ultrasonic signal reflected from the object, but is not limited thereto and the number of ultrasonic sensors may be changed.

Further, the first to fourth ultrasonic sensors may transmit and receive ultrasonic signals. The first to fourth ultrasonic sensors may be sequentially mounted to a line. The first to fourth ultrasonic sensors may be disposed on one side of the vehicle.

The controller 120 may be connected to the plurality of ultrasonic sensors 111, 112, 113, and 114.

The controller 120 may determine at least one of direct detecting and indirect detecting of the object based on each of the ultrasonic signals transmitted from and received by the plurality of ultrasonic sensors 111, 112, 113, and 114, calculate a direct distance value and an indirect distance value if the object is directly and indirectly detected from the determination result, and determine that the object exists in a short-range area if at least one of the calculated direct distance value and indirect distance value is equal to or smaller than a distance determination reference value.

The controller 120 may control the operation of the plurality of ultrasonic sensors 111, 112, 113, and 114. That is, the controller 120 may control transmission/reception operation of the plurality of ultrasonic sensors 111, 112, 113, and 114.

For example, the controller 120 may control transmission/reception timing of the first to fourth ultrasonic sensors. Specifically, if the first to fourth ultrasonic sensors are sequentially mounted to a line, the controller 120 may control transmission/reception timing of the first to fourth ultrasonic sensors such that the transmission/reception operation of the first ultrasonic sensor, the transmission/reception operation of the fourth ultrasonic sensor, the transmission/reception operation of the second ultrasonic sensor, the reception operation of the first ultrasonic sensor, the reception operation of the third ultrasonic sensor, the transmission/reception operation of the third ultrasonic sensor, the reception operation of the fourth ultrasonic sensor, and the reception operation of the second ultrasonic sensor.

The controller 120 may determine at least one of direction detection of the object and indirect detecting of the object based on each of the ultrasonic signals transmitted from the plurality of ultrasonic sensors 111, 112, 113, and 114 and each of the ultrasonic signals reflected from the object and received through the plurality of ultrasonic sensors 111, 112, 113, and 114.

For example, the controller 120 determines at least one of the direct detecting and the indirect direction of the vehicle based on each of the ultrasonic signals transmitted from and received by the first to fourth ultrasonic sensors.

If the object is detected through one ultrasonic sensor having transmitted and received the ultrasonic signals, it may be referred to as direct detecting.

If the object is detected through different ultrasonic sensors having transmitted and received the ultrasonic signals, respectively, it may be referred to as indirect detecting.

For example, the controller 120 may inspect each of the ultrasonic signals transmitted from the plurality of ultrasonic sensors 111, 112, 113, and 114 and each of the ultrasonic signals reflected from the object and received through the plurality of ultrasonic sensors 111, 112, 113, and 114.

If the object is detected through one ultrasonic sensor performing transmission and reception of the ultrasonic signals among each of ultrasonic signals transmitted from the plurality of ultrasonic sensors 111, 112, 113, and 114 and each of the ultrasonic signals reflected from the object and received through the plurality of ultrasonic sensors 111, 112, 113, and 114, that is, the object is detected through ultrasonic direct signals, the controller 120 may determine direct detecting of the object, that is, determine that the object is directly detected.

Further, when the object is detected through different ultrasonic sensors performing transmission and reception of the ultrasonic signals among each of ultrasonic signals transmitted from the plurality of ultrasonic sensors 111, 112, 113, and 114 and each of the ultrasonic signals reflected from the object and received through the plurality of ultrasonic sensors 111, 112, 113, and 114, that is, the object is detected through ultrasonic indirect signals, the controller 120 may determine indirect detecting of the object, that is, determine that the object is indirectly detected.

The ultrasonic direct signal may be an ultrasonic signal transmitted/received through one ultrasonic sensor when the object is directly detected through one ultrasonic sensor. Accordingly, the ultrasonic direct signal may include an ultrasonic direct transmission signal and an ultrasonic direct reception signal.

The ultrasonic indirect signal may be an ultrasonic signal transmitted/received through two different ultrasonic sensors, respectively, when the object is indirectly detected through the different ultrasonic sensors. Accordingly, the ultrasonic indirect signal may include an ultrasonic indirect transmission signal and an ultrasonic indirect reception signal.

The controller 120 may calculate a direct distance value and an indirect distance value from the object according to the determination result of direct detecting and indirect detecting of the object and determine whether there is the object on the basis thereof.

For example, if the object is directly and indirectly detected according to the determination result of direct detecting of the object and indirect detecting of the object, the controller 120 may calculate a direct distance value from the object and an indirect distance value from the object.

The direct distance value from the object and the indirect distance value from the object may be calculated through a speed value of the ultrasonic signal transmitted/received through the ultrasonic sensor and a time point (or a time) at which the ultrasonic signal is transmitted/received. Particularly, the direct distance value from the object and the indirect distance value from the object may be calculated through the same method but are not limited thereto and may be calculated through different methods.

If at least one of the calculated direct distance value from the object and the calculated indirect distance value from the object is equal to or smaller than a preset distance determination reference value, the controller 120 may determine the object exists in a short-range area.

If both the calculated direct distance value from the object and the calculated indirect distance value from the object are larger than the preset distance determination reference value, the controller 120 may determine that the object exists in a long-range area.

The preset distance determination reference value is a distance value for distinguishing the short-range area and the long-range area, and may be set as one value but is not limited thereto. The number of preset distance determination reference values may be plural.

In another example, the controller 120 may calculate the direct distance value from the object if the object is directly detected according to the determination result of direct detecting of the object and indirect detecting of the object.

If the calculated direct distance value from the object is equal to or smaller than the preset distance determination reference value, the controller 120 may determine that the object does not exist in the short-range area.

If the calculated direct distance value from the object is larger than the preset distance determination reference value, the controller 120 may determine that the object exists in a long-range area.

In another example, if the object is indirectly detected according to the determination result of direct detecting of the object and indirect detecting of the object, the controller 120 may calculate the indirect distance from the object.

If the calculated indirect distance value from the object is equal to or smaller than the preset distance determination reference value, the controller 120 may determine that the object does not exist in the short-range area.

If the calculated indirect distance value from the object is larger than the preset distance determination reference value, the controller 120 may determine that the object exists in a long-range area.

The controller 120 may compare at least one ultrasonic reception signal size among the ultrasonic direct reception signal size and the ultrasonic indirect reception signal size with at least one signal reference among a preset ultrasonic direct signal reference and a preset ultrasonic indirect signal reference according to the determination result of direct detecting of the object and indirect detecting of the object and determine whether there is an object on the basis thereof.

For example, if the object is directly and indirectly detected according to the determination result of direct detecting of the object and indirect detecting of the object, the controller 120 may compare the ultrasonic direct reception signal size and the ultrasonic indirect reception signal size with the preset ultrasonic direct signal reference and the preset ultrasonic indirect signal reference, respectively. If the ultrasonic direct reception signal size and the ultrasonic indirect reception signal size are larger than the preset ultrasonic direct signal reference and the preset ultrasonic indirect signal reference, respectively, the controller 120 may calculate the direct distance value from the object and the indirect distance value from the object.

Specifically, the controller 120 may compare the ultrasonic direct reception signal size with the preset ultrasonic direct signal reference and, if the ultrasonic direct reception signal size is larger than the ultrasonic direct signal reference, the controller 120 may calculate the direct distance value. Further, the controller 120 may compare the ultrasonic indirect reception signal size with the preset ultrasonic indirect signal reference and, if the ultrasonic indirect reception signal size is larger than the ultrasonic indirect signal reference, the controller 120 may calculate the indirect distance value.

If at least one of the calculated direct distance value from the object and the calculated indirect distance value from the object is equal to or smaller than a preset distance determination reference value, the controller 120 may determine that there is the object in a short-range area.

If both the calculated direct distance value from the object and the calculated indirect distance value from the object are larger than the preset distance determination reference value, the controller 120 may determine that the object exists in a long-range area.

Meanwhile, if the object is directly and indirectly detected according to the determination result of direct detecting of the object and indirect detecting of the object, the controller 120 may compare the ultrasonic direct reception signal size and the ultrasonic indirect reception signal size with the preset ultrasonic direct signal reference and the preset ultrasonic indirect signal reference, respectively, and if at least one of the ultrasonic direct reception signal size and the ultrasonic indirect reception signal size is smaller than the preset ultrasonic direct signal reference and the preset ultrasonic indirect signal reference, respectively, determine that there is no object.

In another example, if the object is directly detected according to the determination result of direct detecting of the object and indirect detecting of the object, the controller 120 may compare the ultrasonic direct reception signal size with the preset ultrasonic direct signal reference and, if the ultrasonic direct reception signal size is larger than the preset ultrasonic direct signal reference, the controller 120 may calculate the direct distance value from the object.

If the calculated direct distance value from the object is equal to or smaller than the preset distance determination reference value, the controller 120 may determine that the object does not exist in the short-range area.

If the calculated direct distance value from the object is larger than the preset distance determination reference value, the controller 120 may determine that the object exists in a long-range area.

Meanwhile, if the object is directly detected according to the determination result of direct detecting of the object and indirect detecting of the object, the controller 120 may compare the ultrasonic direct reception signal size with the preset ultrasonic direct signal reference and, if the ultrasonic direct reception signal size is smaller than the preset ultrasonic direct signal reference, the controller 120 may determine that there is no object.

In another example, if the object is indirectly detected according to the determination result of direct detecting of the object and indirect detecting of the object, the controller 120 may compare the ultrasonic indirect reception signal size with the preset ultrasonic indirect signal reference and, if the ultrasonic indirect reception signal size is larger than the preset ultrasonic indirect signal reference, the controller 120 may calculate the indirect distance value from the object.

If the calculated indirect distance value from the object is equal to or smaller than the preset distance determination reference value, the controller 120 may determine that the object does not exist in the short-range area.

If the calculated indirect distance value from the object is larger than the preset distance determination reference value, the controller 120 may determine that the object exists in a long-range area.

Meanwhile, if the object is indirectly detected according to the determination result of direct detecting of the object and indirect detecting of the object, the controller 120 may compare the ultrasonic indirect reception signal size with the preset ultrasonic indirect signal reference and, if the ultrasonic indirect reception signal size is smaller than the preset ultrasonic indirect signal reference, the controller 120 may determine that there is no object.

As described above, the apparatus for controlling the vehicle based on detected the object according to the present embodiments may detect the object through the plurality of ultrasonic sensors and the plurality of ultrasonic sensors may directly and indirectly detect the object through the controller. If at least one of a direct distance value and an indirect distance value from the object is equal to or smaller than a preset distance determination reference value, the apparatus for controlling the vehicle based on detected the object may determine that there is an object in a short-range area to distinguish between the direct detecting and indirect detecting for the object actually existing in the short-range area and mis-detecting due to structure reflection and noise, thereby improving accuracy of object detecting in the short-range area.

As described above, the apparatus for controlling the vehicle based on detected the object according to the present embodiments may directly and indirectly detect the object through the plurality of ultrasonic sensors by the controller and, if direct and indirect distance values from the object are larger than a preset distance determination reference value, determine that there is the object in the long-range area, and thus detect the object in the long-range area through indirect detecting of the object and also improve accuracy of object detecting in the long-range area.

Meanwhile, although not illustrated, the apparatus for controlling the vehicle based on detected the object according to the present embodiments may perform the above operations through the radar sensor or the lidar sensor instead of the ultrasonic sensor.

For example, the plurality of second sensors 12 may include a plurality of radar sensors, each of which transmits a radar signal and receives a radar signal reflected form the object, and the controller 120 may determine at least one of direct detecting and indirect detecting of the object based on each of the radar signals transmitted from and received by the plurality of radar sensors, calculate the direct distance value and the indirect distance value if the object is directly and indirectly detected according to the determination result, and determine that the object exists in the short-range area if at least one of the calculated direct distance value and the calculated indirect distance value is equal to or smaller than the distance determination reference value.

If the object is directly and indirectly detected according to the determination result, the controller 120 may compare the radar direction reception signal size and the radar indirect reception signal size with a preset radar direction signal reference and a radar indirect signal reference, respectively, and if the radar direction reception signal size and the radar indirect reception signal size are larger than the preset radar direct signal reference and the radar indirect signal reference, respectively, calculate a direct distance value and an indirect distance value.

Figure 2:
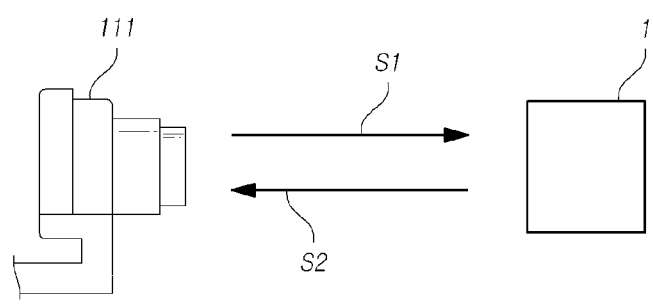
FIG. 2 illustrates direct detecting of an ultrasonic sensor according to the present embodiments.

FIG. 2 illustrates direct detecting of the ultrasonic sensor according to the present embodiments.

Referring to FIG. 2, a first ultrasonic sensor 111 may transmit an ultrasonic signal S1. Further, the first ultrasonic sensor 111 may receive an ultrasonic signal S2 generated by reflection of the ultrasonic signal S1 from an object 1. As described above, direct detecting of the ultrasonic sensor may mean that the object 1 is detected through one ultrasonic sensor performing both transmission and reception of the ultrasonic signal.

Figure 3:
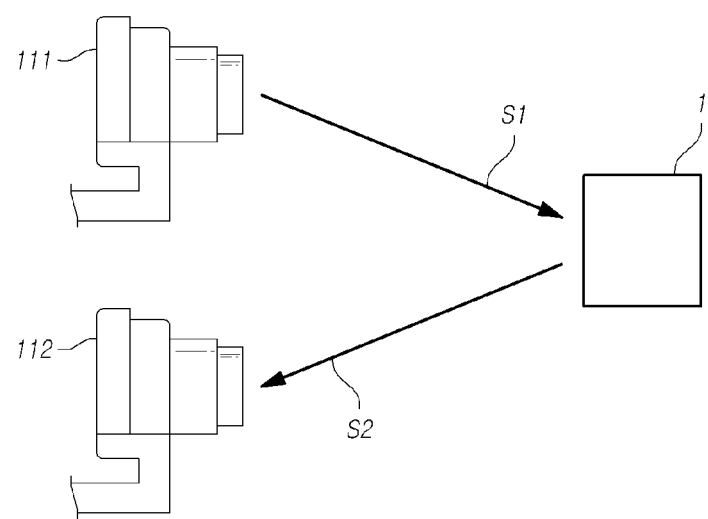
FIG. 3 illustrates indirect detecting of the ultrasonic sensor according to the present embodiments.

FIG. 3 illustrates indirect detecting of the ultrasonic sensor according to the present embodiments.

Referring to FIG. 3, the first ultrasonic sensor 111 may transmit the ultrasonic signal S1. Further, a second ultrasonic sensor 112 may receive an ultrasonic signal S2 generated by reflection of the ultrasonic signal S1 from the object 1. As described above, indirect detecting of the ultrasonic sensor may mean that the object 1 is detected through different ultrasonic sensors performing transmission and reception of the ultrasonic signal, respectively.

Figure 4:
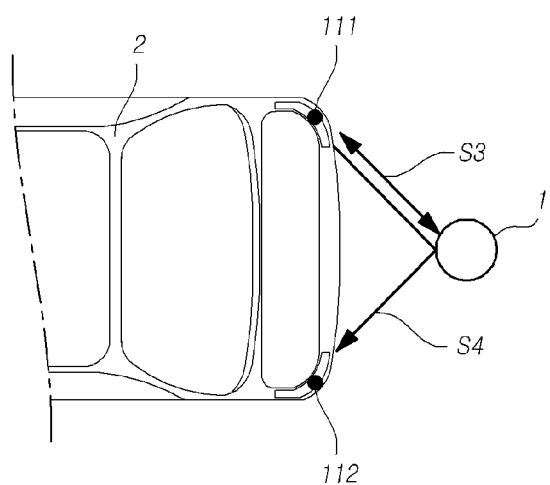
FIG. 4 illustrates direct detecting and indirect detecting through the ultrasonic sensor mounted to the vehicle according to the present embodiments.

FIG. 4 illustrates direct detecting and indirect detecting through the ultrasonic sensor mounted to the vehicle according to the present embodiments.

Referring to FIG. 4, each of the first and second ultrasonic sensors 111 and 112 may be disposed on one rear side of the vehicle 2.

The first ultrasonic sensor 111 may detect the object 1 through an ultrasonic direct signal S3. Such a case may be referred to as direct detecting. The ultrasonic direct signal S3 may include an ultrasonic direct transmission signal which is an ultrasonic signal transmitted through the first ultrasonic sensor 111 and an ultrasonic direct reception signal which is an ultrasonic signal received through the first ultrasonic sensor 111.

The first ultrasonic sensor 111 and the second ultrasonic sensor 112 may detect the object 1 through an ultrasonic indirect signal S4. Such a case may be referred to as indirect detecting. The ultrasonic indirect signal S4 may include an ultrasonic indirect transmission signal which is an ultrasonic signal transmitted through the first ultrasonic sensor 111 and an ultrasonic indirect reception signal which is an ultrasonic signal received through the second ultrasonic sensor 112.

Figure 5:
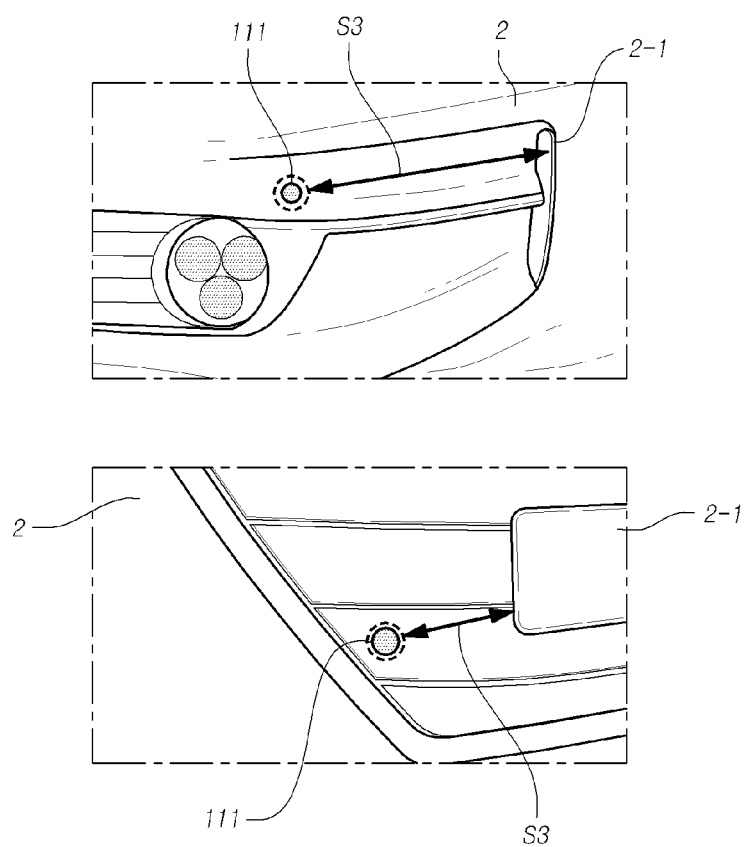
FIG. 5 illustrates an influence on structures of the vehicle when the object is detected through the ultrasonic sensor mounted to the vehicle.

FIG. 5 illustrates an influence on structures of the vehicle when the object is detected through the ultrasonic sensor mounted to the vehicle.

Referring to FIG. 5, the first ultrasonic sensor 111 may be disposed on one front side of the vehicle 2. The first ultrasonic sensor 111 may detect the object through the ultrasonic direct signal S3. Such a case may be referred to as direct detecting.

Meanwhile, as illustrated in FIG. 5, many structures 2-1 may be formed in the vehicle 2. Accordingly, the structures 2-1 may be detected as objects by the ultrasonic direct signal S3 transmitted from the first ultrasonic sensor 111 to the structures 2-1 and then reflected. In such a case, a false alarm may be generated in the vehicle.

Figure 6:
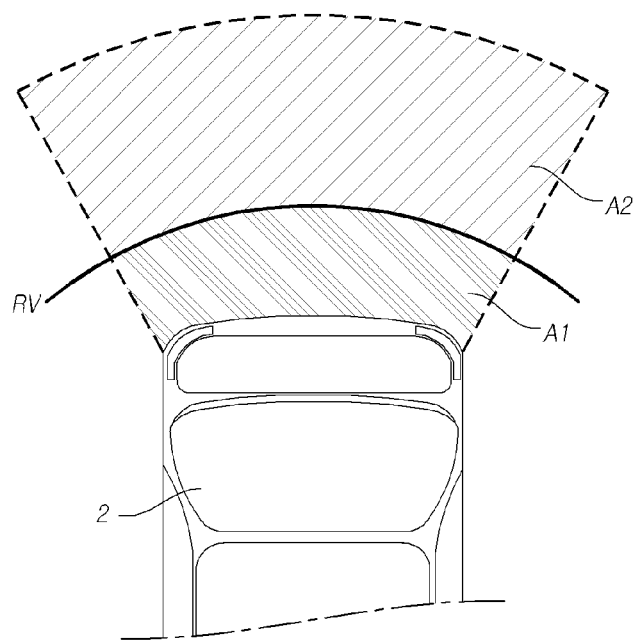
FIG. 6 illustrates a method for detecting the object in a short-range area and a long-range area through the apparatus for controlling the vehicle based on detected the object mounted to the vehicle according to the present embodiments.

FIG. 6 illustrates a method for detecting the object in a short-range area and a long-range area through the apparatus for controlling the vehicle based on detected the object mounted to the vehicle according to the present embodiments.

Referring to FIG. 6, the apparatus 100 for controlling the vehicle based on detected the object mounted to the vehicle 2 may set a distance determination reference value (RV) according to the present embodiments. For example, if the distance determination reference value (RV) is 30 cm, an area having a radius equal to or smaller than 30 cm may be a short-range area (A1) and an area having a radius larger than 30 cm may be a long-range area (A2). Here, a minimum value of the short-range area (A1) and a maximum value of the long-range area (A2) may be set.

Accordingly, in the short-range area (A1), if the ultrasonic direct signal and the ultrasonic indirect signal are received through the apparatus 100 for controlling the vehicle based on detected the object according to the present embodiments, that is, if the object is directly detected from the ultrasonic sensor and also indirectly, it may be determined that the object exists in the short-range area (A1).

In the long-range area (A2), if at least one of the ultrasonic direct signal and the ultrasonic indirect signal is received through the apparatus for controlling the vehicle based on detected the object according to the present embodiments, that is, if at least one of direct detecting and indirect detecting of the object is performed by the ultrasonic sensor, it may be determined that the object exists in the long-range area (A2).

As described above, the vehicle including the apparatus for controlling the vehicle based on a detected object the object according to the present embodiments may separate detecting conditions through a combination of direct and indirect signals according to the detecting distance of the ultrasonic sensor to improve the performance of object detecting in a long-range area through indirect detecting of the object and distinguish between the direct and indirect detecting of the object and mis-detecting due to structure reflection and noise, thereby improving accuracy of object detecting in the short-range area and minimizing a false warning of the object detecting.

Figure 7:
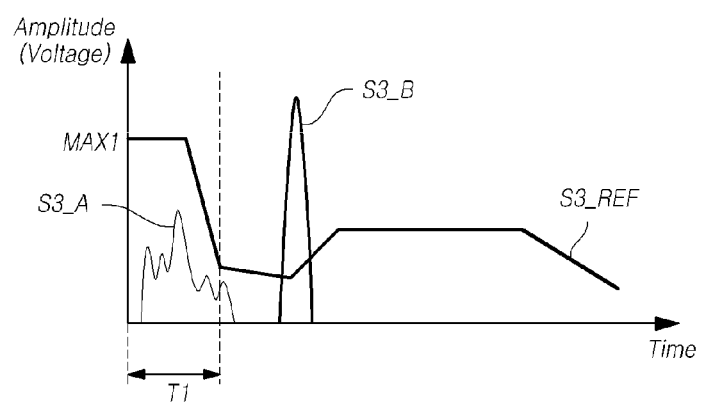
FIG. 7 illustrates an ultrasonic direct signal reference according to the present embodiments.

FIG. 7 illustrates an ultrasonic direct signal reference according to the present embodiments.

Referring to FIG. 7, an alarm reference, that is, a preset ultrasonic direct signal reference (S3_REF) refers to object determination reference sizes for ultrasonic direct reception signals S3_A and S3_B.

That is, as illustrated in FIG. 7, in the case of the ultrasonic direct reception signal S3_A, the size of the ultrasonic direct reception signal S3_A is smaller than the preset ultrasonic direct signal reference (S3_REF), so that it may be determined that there is no object.

Further, as illustrated in FIG. 7, in the case of the ultrasonic direct reception signal S3_B, the size of the ultrasonic direct reception signal S3_B is larger than the preset ultrasonic direct signal reference (S3_REF), so that it may be determined that there is an object.

The preset ultrasonic direct signal reference may have different sizes according to time as illustrated in FIG. 7.

Figure 8:
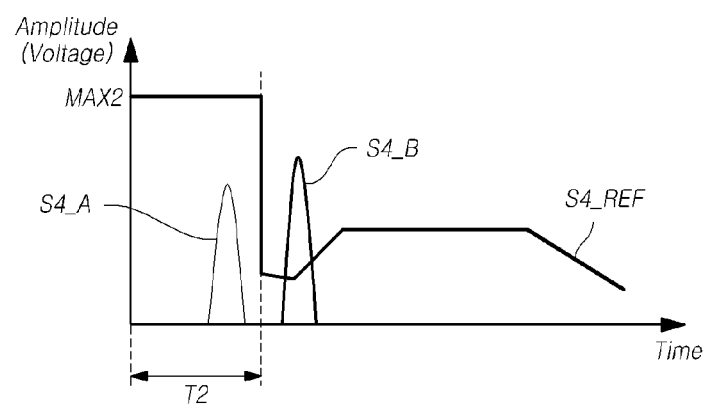
FIG. 8 illustrates an ultrasonic indirect signal reference according to the present embodiments.

FIG. 8 illustrates an ultrasonic indirect signal reference according to the present embodiments.

Referring to FIG. 8, an alarm reference, that is, a preset ultrasonic indirect signal reference (S4_REF) may refer to object determination reference sizes for ultrasonic indirect reception signals S4_A and S4_B.

That is, as illustrated in FIG. 8, in the case of the ultrasonic indirect reception signal S4_A, the size of the ultrasonic indirect reception signal S4_A is smaller than the preset ultrasonic indirect signal reference (S4_REF), so that it may be determined that there is no object.

Further, as illustrated in FIG. 8, in the case of the ultrasonic indirect reception signal S4_B, the size of the ultrasonic indirect reception signal S4_B is larger than the preset ultrasonic direct signal reference (S4_REF), so that it may be determined that there is an object.

The preset ultrasonic indirect signal reference may have different sizes according to time as illustrated in FIG. 7.

Referring to FIGS. 7 and 8, the ultrasonic direct signal reference (S3_REF) and the ultrasonic indirect signal reference (S4_REF) according to the present embodiments may have different sizes. Particularly, as illustrated in FIGS. 7 and 8, a maximum value (MAX1) of the ultrasonic direct signal reference (S3_REF) may be smaller than a maximum value (MAX2) of the ultrasonic indirect signal reference (S4_REF). Further, a maintenance time (T1) of the maximum value (MAX1) of the ultrasonic direct signal reference (S3_REF) may be shorter than a maintenance time (T2) of the maximum value (MAX2) of the ultrasonic indirect signal reference (S4_REF).

Meanwhile, as described above, if another second sensor 12, for example, a radar sensor is used instead of the ultrasonic sensor, a maximum value of a preset radar direct signal reference may be smaller than a maximum value of a preset radar indirect signal reference, and a maintenance time of the maximum value of the preset radar direct signal reference may be shorter than a maintenance time of the maximum value of the preset radar indirect signal reference.

Figure 9:
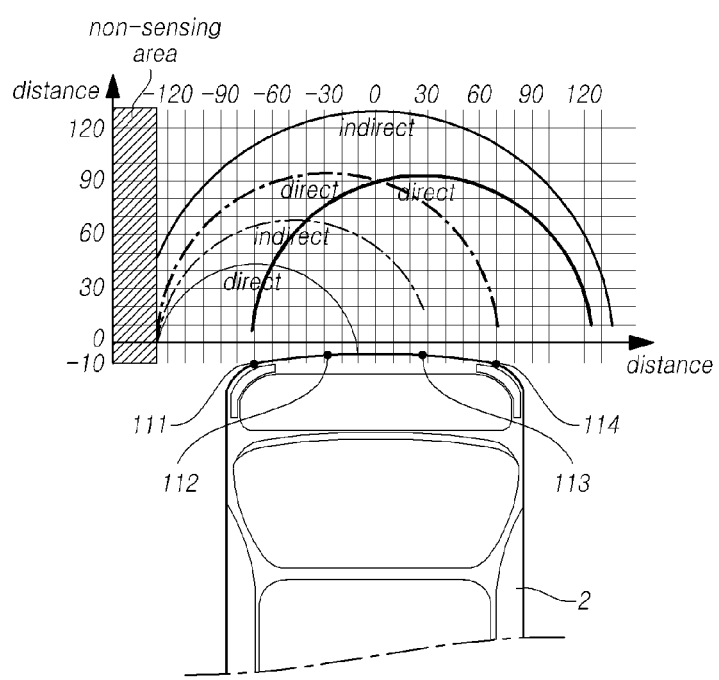
FIG. 9 illustrates direct detecting and indirect detecting ranges according to the present embodiments.

FIG. 9 illustrates direct detecting and indirect detecting ranges according to the present embodiments.

Referring to FIG. 9, the apparatus for controlling the vehicle based on detected the object mounted to the vehicle 2 according to the present embodiments may include four ultrasonic sensors 111, 112, 113, and 114.

As illustrated in FIG. 9, each of the four ultrasonic sensors 111, 112, 113, and 114 may have a direct detecting range. Further, the four ultrasonic sensors 111, 112, 113, and 114 may have indirect detecting ranges.

The direct detecting range and the indirect detecting range may be set as illustrated in FIG. 9, but are not limited thereto and may be modified.

That is, since the ultrasonic signal can be transmitted/received even in an area other than the direct and indirect detecting ranges, the direct and indirect detecting ranges may be randomly extended and also reduced. In other words, the direct and indirect detecting ranges may be a preset area partially selected from areas in which the ultrasonic signal can be transmitted/received, rather than the areas in which the ultrasonic signal can be transmitted/received.

Accordingly, the short-range area (for example, an area equal to or below 30 cm) is an area in which an ultrasonic direct signal and an ultrasonic indirect signal can be simultaneously received, that is, an area in which the object can be directly detected and also indirectly detected by the ultrasonic sensor, so that there is no concern over the case in which the ultrasonic indirect signal cannot be received, that is, the case in which the object cannot be indirectly detected by the ultrasonic sensor.

Figure 10:
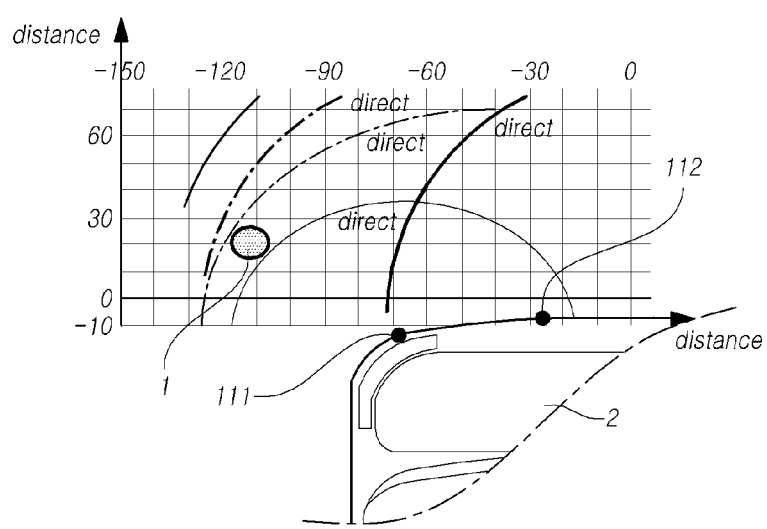
FIG. 10 illustrates extension of the direct detecting range according to the present embodiments.

FIG. 10 illustrates extension of the direct detecting range according to the present embodiments.

Referring to FIG. 10, in the short-range area (for example, an area equal to or below 30 cm), there is no concern over the case in which the ultrasonic indirect signal cannot be received, that is, the object cannot be indirectly detected by the ultrasonic sensor as illustrated in FIG. 10, but the case in which the ultrasonic indirect signal can be received but the ultrasonic direct signal cannot be received, that is, the object cannot be directly detected by the ultrasonic sensors 111 and 112 may be generated.

In this case, by controlling and extending the ultrasonic direct range as illustrated in FIG. 9, the above problem can be compensated As described above, the apparatus for controlling the vehicle based on detected the object according to the present embodiments may reinforce accuracy of object detecting through a combination of direct and indirect signals of the ultrasonic sensor. Particularly, the vehicle including the apparatus for controlling the vehicle based on detected the object according to the present embodiments can more accurately distinguish between an object detecting signal and a noise signal through the combination of direct and indirect signals, so that the performance of object detecting in the short-range area can be improved and reflection by structures from the outside and a false alarm for the noise signal can be minimized.

The apparatus for controlling the vehicle based on detected the object according to the present embodiments may be included in Parking Distance Warning (PDW) using the ultrasonic sensor.

FIGS. 11A to 11H illustrate scheduling of ultrasonic sensors mounted to the vehicle according to the present embodiments.

Referring to FIGS. 11A to 11H, the apparatus for controlling the vehicle based on detected the object according to the present embodiments may be mounted to the vehicle and, particularly, may include a left ultrasonic sensor (L), a left center ultrasonic sensor (LC), a right center ultrasonic sensor (RC), and a right ultrasonic sensor (R) sequentially mounted to a line on the front part of the vehicle.

The apparatus for controlling the vehicle based on detected the object according to the present embodiments may control transmission/reception timing of the left ultrasonic sensor (L), the left center ultrasonic sensor (LC), the right center ultrasonic sensor (RC), and the right ultrasonic sensor (R) and detect (or determine) objects existing in the short-range area and the long-range area on the bass of each of the ultrasonic signals transmitted from and received by the left ultrasonic sensor (L), the left center ultrasonic sensor (LC), the right center ultrasonic sensor (RC), and the right ultrasonic sensor (R).

Figure 11:
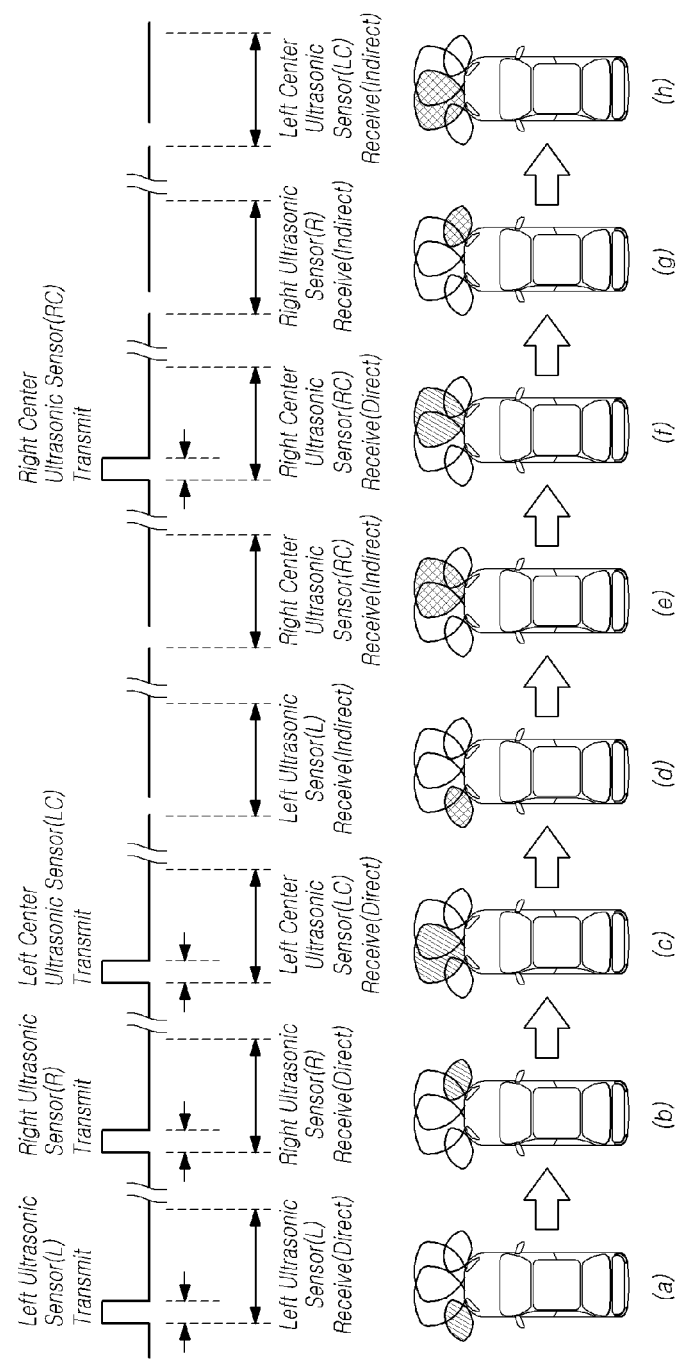
FIG. 11 illustrates scheduling of ultrasonic sensors mounted to the vehicle according to the present embodiments.

Hereinafter, scheduling of the ultrasonic sensors mounted to the vehicle will be described. Particularly, areas illustrated in FIG. 11 are to distinguish between direct detecting and indirect detecting operations of each ultrasonic sensor.

Referring to FIG. 11A, the left ultrasonic sensor (L) may first transmit an ultrasonic signal and then may receive an ultrasound signal reflected from the object. As described above, the object may be directly detected through the left ultrasonic sensor (L).

Referring to FIG. 11B, after FIG. 11A, the right ultrasonic sensor (R) may transmit an ultrasonic signal and then may receive an ultrasound signal reflected from the object. As described above, the object may be directly detected through the right ultrasonic sensor (R).

Referring to FIG. 11C, after FIG. 11B, the left center ultrasonic sensor (LC) may transmit an ultrasonic signal and then may receive an ultrasound signal reflected from the object. As described above, the object may be directly detected through the left center ultrasonic sensor (LC).

Referring to FIG. 11D, after FIG. 11C, the left ultrasonic sensor (L) may receive an ultrasonic signal reflected from the object. As described above, the object may be indirectly detected through the left ultrasonic sensor (L).

Referring to FIG. 11E, after FIG. 11D, the right center ultrasonic sensor (RC) may receive an ultrasonic signal reflected from the object. As described above, the object may be indirectly detected through the right center ultrasonic sensor (RC).

Referring to FIG. 11F, after FIG. 11E, the right center ultrasonic sensor (RC) may transmit an ultrasonic signal and then may receive an ultrasound signal reflected from the object. As described above, the object may be directly detected through the right center ultrasonic sensor (RC).

Referring to FIG. 11G, after FIG. 11F, the right ultrasonic sensor (R) may receive an ultrasonic signal reflected from the object. As described above, the object may be indirectly detected through the right ultrasonic sensor (R).

Referring to FIG. 11H, after FIG. 11G, the left center ultrasonic sensor (LC) may receive an ultrasonic signal reflected from the object. As described above, the object may be indirectly detected through the left center ultrasonic sensor (LC).

Particularly, since the ultrasonic signal reflected from the object is high in the short-range area, the object may be directly and indirectly detected through the ultrasonic sensors (L, LC, RC, and R). That is, the short-range area may be an area in which the ultrasonic direct signal and the ultrasonic indirect signal can be simultaneously received, that is, in which the object can be directly detected by the ultrasonic sensor and also indirectly detected.

Hereinafter, the method for controlling the vehicle based on detected the object according to the present embodiments will be described with reference to the accompanying drawings. Particularly, the part which overlaps the description of the apparatus for controlling the vehicle based on detected the object according to the present embodiments made with reference to FIGS. 1 to 11 will be omitted hereinafter for simplicity of description.

The method for controlling the vehicle based on detected the object according to the present embodiments may be performed by an apparatus including a plurality of ultrasonic sensors and a controller, that is, the apparatus for controlling the vehicle based on detected the object according to the present embodiments.

Figure 12:
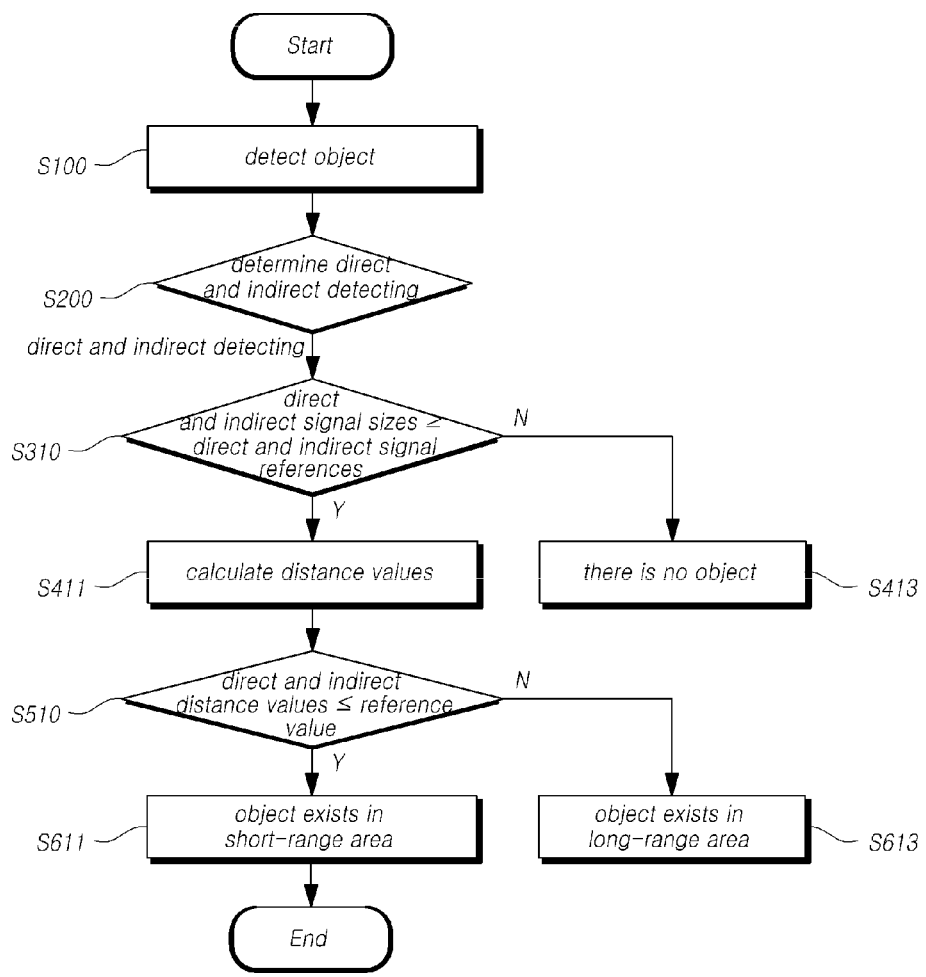
FIG. 12 is a flowchart illustrating in detail the method for controlling the vehicle based on detected the object when it is determined that the object is directly and indirectly detected according to the present embodiments.

FIG. 12 is a flowchart illustrating in detail the method for controlling the vehicle based on detected the object when it is determined that the object is directly and indirectly detected according to the present embodiments.

Referring to FIG. 12, the object may be first detected through a plurality of ultrasonic sensors in S100. Specifically, ultrasonic signals may be transmitted through the plurality of ultrasonic sensors, respectively.

Thereafter, ultrasonic signals reflected from the object may be received through the plurality of ultrasonic sensors, respectively. The plurality of ultrasonic sensors may include first to fourth ultrasonic sensors.

Thereafter, at least one of direct detecting and indirect detecting of the object may be determined in S200.

For example, at least one of the direct detecting of the object and the indirect detecting of the object may be determined based on each of the ultrasonic signals transmitted from the plurality of ultrasonic sensors and each of the ultrasonic signals reflected from the object and received through the plurality of ultrasonic sensors.

For example, transmission/reception timing of the first to fourth ultrasonic sensors may be controlled and at least one of the direct detecting of the object and the indirect detecting of the object may be determined based on each of the ultrasonic signals transmitted from and received by the first to fourth ultrasonic sensors at the transmission/reception timing.

The transmission/reception timing of the first to fourth ultrasonic sensors may be controlled such that the transmission/reception operation of the first ultrasonic sensor, the transmission/reception operation of the fourth ultrasonic sensor, the transmission/reception operation of the second ultrasonic sensor, the reception operation of the first ultrasonic sensor, the reception operation of the third ultrasonic sensor, the transmission/reception operation of the third ultrasonic sensor, the reception operation of the fourth ultrasonic sensor, and the reception operation of the second ultrasonic sensor are sequentially performed.

Thereafter, signal references may be compared according to the determination result of step S200 and distance values may be calculated according to the comparison result.

For example, if the object is directly and indirectly detected according to the determination result of step S200, the ultrasonic direct reception signal size and the ultrasonic indirect reception signal size may be compared with a preset ultrasonic direct signal reference and a preset ultrasonic indirect signal reference, respectively, in S310.

Next, if the ultrasonic direct reception signal size and the ultrasonic indirect reception signal size are larger than the preset ultrasonic direct signal reference and the preset ultrasonic indirect signal reference, respectively, according to the comparison result of step S310, a direct distance value from the object and an indirect distance value to the objet may be calculated in S411.

If at least one of the ultrasonic direct reception signal size and the ultrasonic indirect reception signal size is smaller than the preset ultrasonic direct signal reference and the preset ultrasonic indirect signal reference according to the comparison result of step S310, it may be determined that there is no object in S413.

The ultrasonic direct signal reference and the ultrasonic indirect signal reference may have different sizes. Particularly, a maximum value of the ultrasonic direct signal reference may be smaller than a maximum value of the ultrasonic indirect signal reference. A maintenance time of the maximum value of the ultrasonic direct signal reference may be shorter than a maintenance time of maximum value of the ultrasonic indirect signal reference.

Thereafter, at least one of the calculated direct and indirect distance values from the object may be compared with a preset distance determination reference value and it may be determined whether there is an object according to the comparison result.

For example, each of the direct distance value from the object and the indirect distance value from the object calculated through step S411 may be compared with the preset distance determination result value in S510.

Next, if at least one of the direct and indirect distance values from the object calculated through step S411 is equal to or smaller than the preset distance determination reference value according to the comparison result of step S510, it may be determined that the object exists in the short-range area in S611.

If both the direct and indirect distance values from the object calculated through step S411 are larger than the preset distance determination reference value according to the comparison result of step S510, it may be determined that the object exists in the long-range area in S613.

Figure 13:
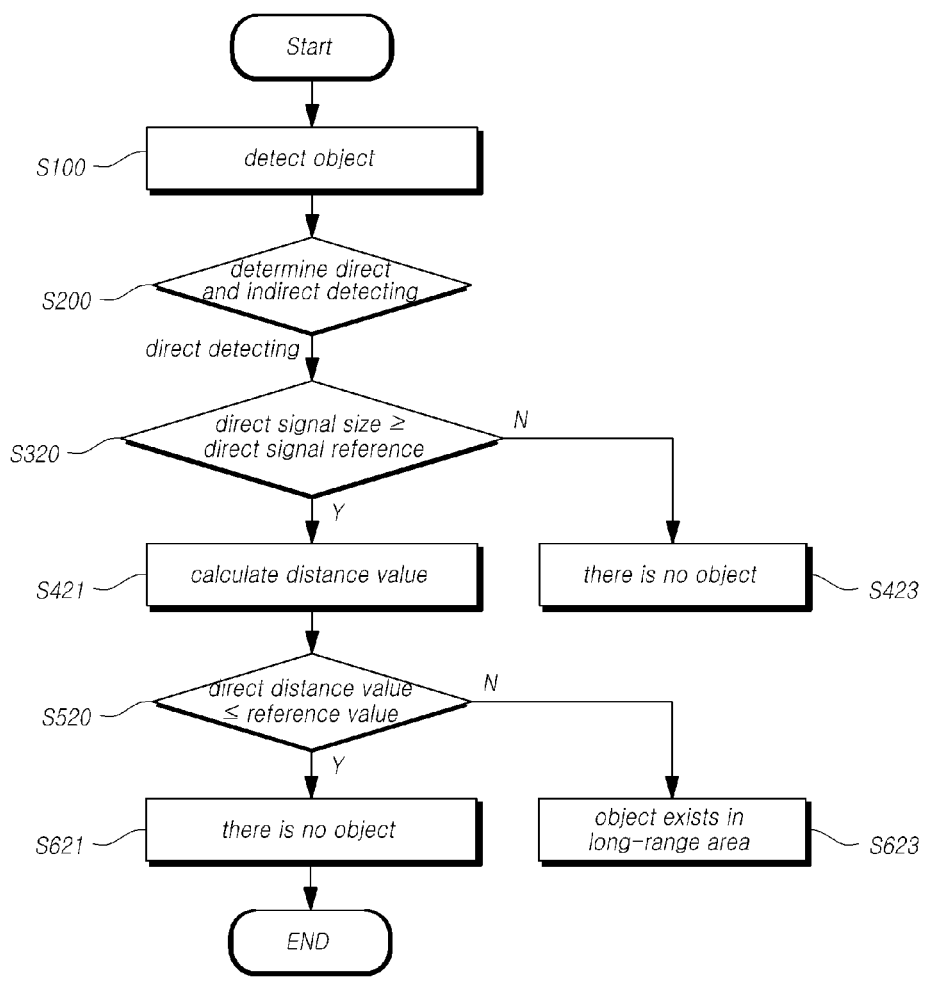
FIG. 13 is a flowchart illustrating in detail a method for controlling the vehicle based on detected the object when it is determined that the object is directly detected according to the present embodiments.

FIG. 13 is a flowchart illustrating in detail a method for controlling the vehicle based on detected the object when it is determined that the object is directly detected according to the present embodiments.

Referring to FIG. 13, the object may be first detected through a plurality of ultrasonic sensors in S100.

Specifically, ultrasonic signals may be transmitted through the plurality of ultrasonic sensors, respectively. Thereafter, ultrasonic signals reflected from the object may be received through the plurality of ultrasonic sensors, respectively. The plurality of ultrasonic sensors may include first to fourth ultrasonic sensors.

Thereafter, at least one direct detecting and indirect detecting of the object may be determined in S200.

For example, at least one of the direct detecting of the object and the indirect detecting of the object may be determined based on each of the ultrasonic signals transmitted from the plurality of ultrasonic sensors and each of the ultrasonic signals reflected from the object and received through the plurality of ultrasonic sensors.

For example, transmission/reception timing of the first to fourth ultrasonic sensors may be controlled and at least one of the direct detecting of the object and the indirect detecting of the object may be determined based on each of the ultrasonic signals transmitted from and received by the first to fourth ultrasonic sensors at the transmission/reception timing.

The transmission/reception timing of the first to fourth ultrasonic sensors may be controlled such that the transmission/reception operation of the first ultrasonic sensor, the transmission/reception operation of the fourth ultrasonic sensor, the transmission/reception operation of the second ultrasonic sensor, the reception operation of the first ultrasonic sensor, the reception operation of the third ultrasonic sensor, the transmission/reception operation of the third ultrasonic sensor, the reception operation of the fourth ultrasonic sensor, and the reception operation of the second ultrasonic sensor are sequentially performed.

Thereafter, the determination result of step S200 may be compared with a signal reference and a distance value may be calculated according to the comparison result.

For example, if the object is directly detected according to the determination result of step S200, the ultrasonic direct reception signal size may be compared with a preset ultrasonic direct signal in S320.

Next, if the ultrasonic direct reception signal size is larger than the preset ultrasonic direct signal reference according to the comparison result of step S320, a direct distance value form the object may be calculated in S421.

If the ultrasonic direct reception signal size is smaller than the preset ultrasonic direct signal reference according to the comparison result of step S320, it may be determined that there is no object in S423.

Thereafter, at least one of the calculated direct and indirect distance values from the object may be compared with a preset distance determination reference value and it may be determined whether there is an object according to the comparison result.

For example, the direct distance value from the object calculated through step S421 may be compared with the preset distance determination reference value in S520.

Next, if the direct distance value from the object calculated through step S421 is equal to or smaller than the preset distance determination reference value according to the comparison result of step S520, it may be determined that there is no object in the short-range area in S621.

If the direct distance value from the object calculated through step S421 is larger than the preset distance determination reference value according to the comparison result of step S520, it may be determined that the object exists in the long-range area in S623.

Figure 14:
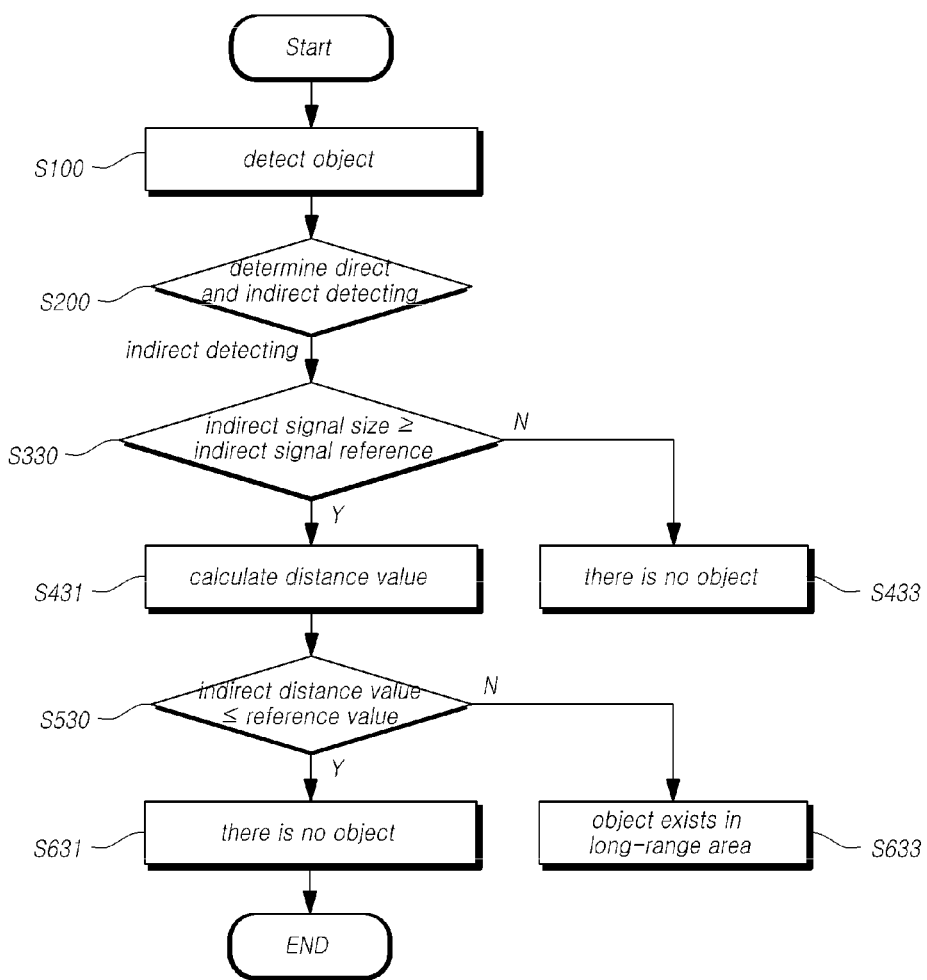
FIG. 14 is a flowchart illustrating in detail the method for controlling the vehicle based on detected the object when it is determined that the object is indirectly detected according to the present embodiments.

FIG. 14 is a flowchart illustrating in detail the method for controlling the vehicle based on detected the object when it is determined that the object is indirectly detected according to the present embodiments.

Referring to FIG. 14, the object can be first detected through a plurality of ultrasonic sensors in S100.

Specifically, ultrasonic signals may be transmitted through the plurality of ultrasonic sensors, respectively. Thereafter, ultrasonic signals reflected from the object may be received through the plurality of ultrasonic sensors, respectively. The plurality of ultrasonic sensors may include first to fourth ultrasonic sensors.

Thereafter, at least one direct detecting and indirect detecting of the object may be determined in S200.

For example, at least one of the direct detecting of the object and the indirect detecting of the object may be determined based on each of the ultrasonic signals transmitted from the plurality of ultrasonic sensors and each of the ultrasonic signals reflected from the object and received through the plurality of ultrasonic sensors.

For example, transmission/reception timing of the first to fourth ultrasonic sensors may be controlled and at least one of the direct detecting of the object and the indirect detecting of the object may be determined based on each of the ultrasonic signals transmitted from and received by the first to fourth ultrasonic sensors at the transmission/reception timing.

The transmission/reception timing of the first to fourth ultrasonic sensors may be controlled such that the transmission/reception operation of the first ultrasonic sensor, the transmission/reception operation of the fourth ultrasonic sensor, the transmission/reception operation of the second ultrasonic sensor, the reception operation of the first ultrasonic sensor, the reception operation of the third ultrasonic sensor, the transmission/reception operation of the third ultrasonic sensor, the reception operation of the fourth ultrasonic sensor, and the reception operation of the second ultrasonic sensor are sequentially performed.

Thereafter, the determination result of step S200 may be compared with a signal reference and a distance value may be calculated according to the comparison result.

For example, if the object is indirectly detected according to the determination result of step S200, the ultrasonic indirect reception signal size may be compared with the preset ultrasonic indirect signal in S330.

Next, if the ultrasonic indirect reception signal size is larger than the preset ultrasonic indirect signal reference according to the comparison result of step S330, an indirect distance value form the object may be calculated in S431.

If the ultrasonic indirect reception signal size is smaller than the preset ultrasonic indirect signal reference according to the comparison result of step S330, it may be determined that there is no object in S433.

Thereafter, at least one of the calculated direct and indirect distance values from the object may be compared with a preset distance determination reference value and it may be determined whether there is an object according to the comparison result.

For example, the indirect distance value from the object calculated through step S431 may be compared with the preset distance determination reference value in S530.

Next, if the indirect distance value from the object calculated through step S431 is equal to or smaller than the preset distance determination reference value according to the comparison result of step S530, it may be determined that the object does not exist in the short-range area in S631.

If the indirect distance value from the object calculated through step S431 is larger than the preset distance determination reference value according to the comparison result of step S530, it may be determined that the object exists in the long-range area in S633.

Figure 15:
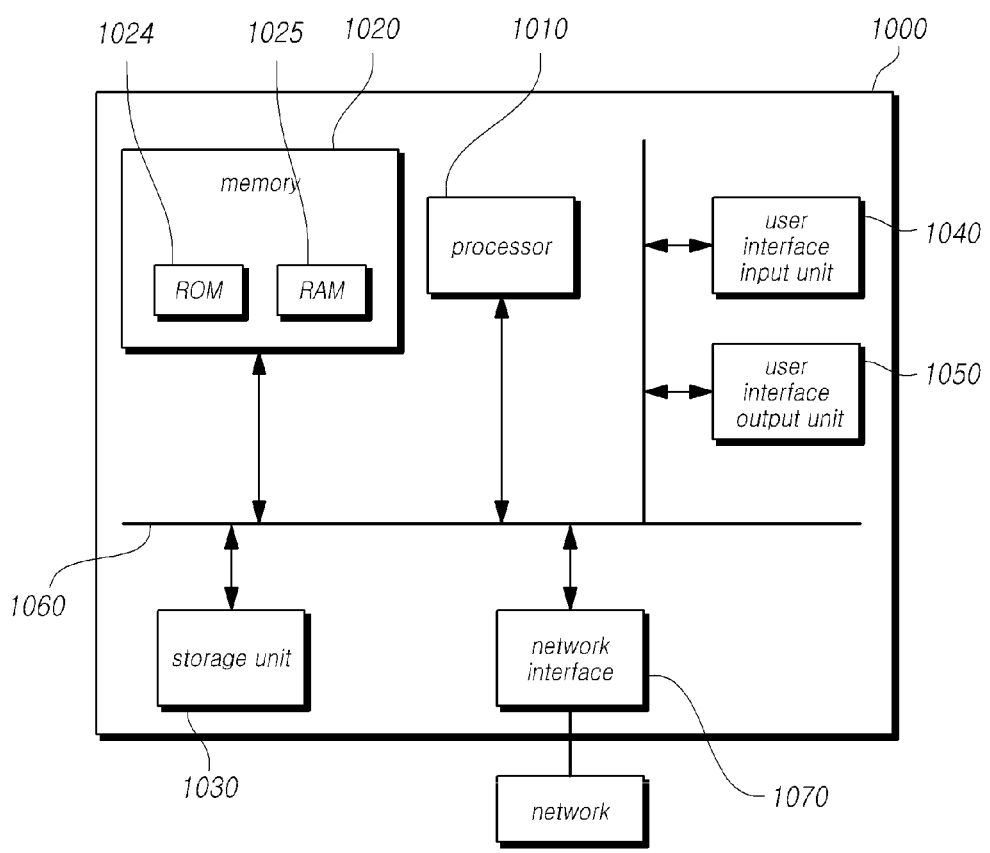
FIG. 15 is a block diagram illustrating a computer system of the apparatus for controlling the vehicle based on detected the object according to the present embodiments.

FIG. 15 is a block diagram illustrating a computer system of the apparatus for controlling the vehicle based on detected the object according to the present embodiments.

The present embodiments described above may be implemented by, for example, a computer-readable recording medium within a computer system. As illustrated in FIG. 15, a computer system 1000, such as the apparatus for controlling the vehicle based on detected the object, may include at least one element among one or more processor 1010, a memory 1020, a storage unit 1030, a user interface input unit 1040, and a user interface output unit 1050, and the elements may communicate with each other through a bus 1060. Further, the computer system 1000 may further include a network interface 1070 for accessing a network. The processor 1010 may be a CPU or a semiconductor device for executing a processing instruction stored in the memory 1020 and/or the storage unit 1030. The memory 1020 and the storage unit 1030 may include various types of volatile/non-volatile recording media. For example, the memory may include a ROM 1021 and a RAM 1023.

Accordingly, embodiments of the present disclosure may be implemented by a non-volatile computer recording medium storing a method conducted by a computer or computer-executable instructions. The instructions may be performed according to at least one embodiment of the present disclosure if executed by the processor.

Figure 16:
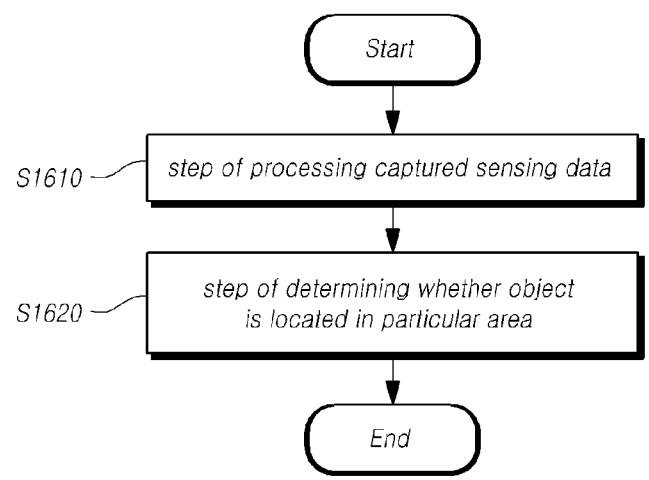
FIG. 16 is a flowchart illustrating the method for controlling the vehicle based on detected the object according to the present embodiments.

FIG. 16 is a flowchart illustrating the method for controlling the vehicle based on detected the object according to the present embodiments.

Referring to FIG. 16, the method for controlling the vehicle based on detected the object may include step S1610 of capturing sensing data and processing the captured sensing data by a plurality of the second sensors 12 mounted to a vehicle to have a field of view of an interior or an exterior of the vehicle and step S1620 of recognizing a type of the sensing data, based on the processing of the sensing data and determining whether there is an object located in a particular area, based on a distance value corresponding to the recognized type of the sensing data.

Step S1620 of determining whether there is the object in the particular area may include recognizing the type of sensing data including at least one piece of direct sensing data and indirect sensing data from the processing result of the sensing data, comparing a distance value acquired from the processing result of the sensing data of which the type has been recognized with a preset distance determination reference value, and determining whether there is the object located in the particular area according to the comparison result.

Step S1620 of determining whether there is the object in the particular area may include recognizing direct sensing data and indirect sensing data and, if at least one of a direct distance value acquired by the processing result of the direct sensing data and an indirect distance value acquired by the processing result of the indirect sensing data is equal to or smaller than a distance determination reference value, determining that the object exists in the short-range area.

Step S1620 of determining whether there is the object in the particular area may include recognizing direct sensing data and indirect sensing data and, if at least one of the direct distance value acquired by the processing result of the direct sensing data and the indirect distance value acquired by the processing result of the indirect sensing data is larger than the distance determination reference value, determining that the object exists in the long-range area.

Step S1620 of determining whether there is the object located in the particular area may include recognizing one of the direct sensing data and the indirect sensing data and, if a distance value acquired by a processing result of one of the direct sensing data and the indirect sensing data is equal to or smaller than the distance determination reference value, determining that the object does not exist.

Step S1620 of determining whether there is the object located in the particular area may include recognizing one of the direct sensing data and the indirect sensing data and, if a distance value acquired by a processing result of one of the direct sensing data and the indirect sensing data is larger than the distance determination reference value, determining that the object exists in a long-range area.

If the plurality of second sensors 12 includes a plurality of ultrasonic sensors, each of which transmits an ultrasonic signal and receives an ultrasonic signal reflected from the object, step S1620 of determining whether there is the object located in the particular area may include determining at least one of direct detecting and indirect detecting of the object, based on each of ultrasonic signals transmitted from and received by the plurality of ultrasonic sensors, calculating a direct distance value and an indirect distance value if the object is directly and indirectly detected according to a determination result, and determining that the object exists in a short-range area if at least one of the calculated direct distance value and indirect distance value is equal to or smaller than the distance determination reference value.

Step S1620 of determining whether there is the object located in the particular area may further include a process of, if the object is directly and indirectly detected according to a determination result, comparing a size of an ultrasonic direct reception signal and a size of an ultrasonic indirect reception signal with a preset ultrasonic direct signal reference and a preset ultrasonic indirect signal reference, respectively, and if the size of the ultrasonic direct reception signal and the size of the ultrasonic indirect reception signal are larger than the preset ultrasonic direct signal reference and the ultrasonic indirect signal reference, respectively, calculating the direct distance value and the indirect distance value.

A maximum value of the preset ultrasonic direct signal reference may be smaller than a maximum value of the preset ultrasonic indirect signal reference, and a maintenance time of the maximum value of the preset ultrasonic direct signal reference may be shorter than a maintenance time of the maximum value of the preset ultrasonic indirect signal reference.

If the plurality of second sensors 12 includes first to fourth ultrasonic sensors, each of which transmits an ultrasonic signal and receives an ultrasonic signal reflected from the object, step S1620 of determining whether there is the object located in the particular area may include controlling transmission/reception timing of the first to fourth ultrasonic sensors, determines at least one of direct detecting and indirect detecting of the object, based on each of ultrasonic signals transmitted from and received by the first to fourth ultrasonic sensors, calculating a direct distance value and an indirect distance value if the object is directly and indirectly detected according to a determination result, and determining that the object exists in a short-range area if at least one of the calculated direct distance value and indirect distance value is equal to or smaller than the distance determination reference value.

Transmission/reception timing of the first to fourth ultrasonic sensors is controlled such that a transmission/reception operation of the first ultrasonic sensor, a transmission/reception operation of the fourth ultrasonic sensor, a transmission/reception operation of the second ultrasonic sensor, a reception operation of the first ultrasonic sensor, a reception operation of the third ultrasonic sensor, a transmission/reception operation of the third ultrasonic sensor, a reception operation of the fourth ultrasonic sensor, and a reception operation of the second ultrasonic sensor may be sequentially performed.

Although the embodiments of the apparatus and the method for detecting the object according to the present embodiments have been described, the present embodiments are not limited thereto and can be variously modified without departing from the scope of the claims, the detailed description of the present disclosure, and the accompanying drawings. Such modifications also belong to the present embodiments.

What is claimed is:

1. An apparatus for controlling a vehicle, the apparatus comprising:
   a plurality of sensors mounted to the vehicle to have a field of view of an exterior of the vehicle and capture sensing data; and
   a controller communicatively connected to the plurality of sensors and configured to:
   recognize a type of the sensing data comprising at least one piece of direct sensing data or indirect sensing data from a processing result of the sensing data,
   compare a distance value acquired by the processing result of the sensing data of which the type is recognized with a preset distance determination reference value, determine whether there is an object located in a particular area according to a comparison result,
search for a parking area around the vehicle according to a determination result of the object, and
perform control of the vehicle to move based on the searched parking area, wherein the plurality of sensors comprises a plurality of ultrasonic sensors, each of which transmits an ultrasonic signal and receives an ultrasonic signal reflected from the object, wherein the controller:
determines at least one of direct detecting or indirect detecting of the object, based on each of ultrasonic signals transmitted from and received by the plurality of ultrasonic sensors,
calculates a direct distance value and an indirect distance value if the object is directly and indirectly detected according to a determination result of the plurality of ultrasonic sensors, and
determines that the object exists in a short-range area if at least one of the calculated direct distance value or indirect distance value is equal to or smaller than the distance determination reference value, wherein, if the object is directly and indirectly detected according to the determination result of the plurality of ultrasonic sensors, the controller compares a size of an ultrasonic direct reception signal and a size of an ultrasonic indirect reception signal with a preset ultrasonic direct signal reference and a preset ultrasonic indirect signal reference, respectively, and wherein, if the size of the ultrasonic direct reception signal and the size of the ultrasonic indirect reception signal are larger than the preset ultrasonic direct signal reference and the ultrasonic indirect signal reference, respectively, the controller calculates the direct distance value and the indirect distance value.

2. The apparatus of claim 1, wherein the controller recognizes the direct sensing data and the indirect sensing data, and
wherein, if at least one of the direct distance value acquired by a processing result of the direct sensing data or the indirect distance value acquired by a processing result of the indirect sensing data is equal to or smaller than the distance determination reference value, the controller determines that the object exists in the short-range area.

3. The apparatus of claim 1, wherein the controller recognizes the direct sensing data and the indirect sensing data, and
wherein, if at least one of the direct distance value acquired by a processing result of the direct sensing data or the indirect distance value acquired by a processing result of the indirect sensing data is larger than the distance determination reference value, the controller determines that the object exists in a long-range area.

4. The apparatus of claim 1, wherein the controller recognizes one of the direct sensing data and the indirect sensing data, and
wherein, if a distance value acquired by a processing result of one of the direct sensing data and the indirect sensing data is equal to or smaller than the distance determination reference value, the controller determines that the object does not exist.

5. The apparatus of claim 1, wherein the controller recognizes one of the direct sensing data and the indirect sensing data, and
wherein, if a distance value acquired by a processing result of one of the direct sensing data and the indirect sensing data is larger than the distance determination reference value, the controller determines that the object exists in a long-range area.

6. The apparatus of claim 1, wherein a maximum value of the preset ultrasonic direct signal reference is smaller than a maximum value of the preset ultrasonic indirect signal reference, and
wherein a maintenance time of the maximum value of the preset ultrasonic direct signal reference is shorter than a maintenance time of the maximum value of the preset ultrasonic indirect signal reference.

7. The apparatus of claim 1, wherein the plurality of sensors comprises first to fourth ultrasonic sensors, each of which transmits an ultrasonic signal and receives an ultrasonic signal reflected from the object, and
wherein the controller:
controls a transmission and reception timing of the first to fourth ultrasonic sensors,
determines at least one of direct detecting or indirect detecting of the object, based on each of ultrasonic signals transmitted from and received by the first to fourth ultrasonic sensors,
calculates a direct distance value and an indirect distance value if the object is directly and indirectly detected according to a determination result of the first to fourth ultrasonic sensors, and
determines that the object exists in the short-range area if at least one of the calculated direct distance value or indirect distance value is equal to or smaller than the distance determination reference value.

8. The apparatus of claim 7, wherein, if the object is directly and indirectly detected according to the determination result of the first to fourth ultrasonic sensors, the controller compares the size of the ultrasonic direct reception signal and the size of the ultrasonic indirect reception signal with the preset ultrasonic direct signal reference and the preset ultrasonic indirect signal reference, respectively, and
wherein, if the size of the ultrasonic direct reception signal and the size of the ultrasonic indirect reception signal are larger than the preset ultrasonic direct signal reference and the ultrasonic indirect signal reference, respectively, the controller calculates the direct distance value and the indirect distance value.

9. The apparatus of claim 7, wherein the first to fourth ultrasonic sensors are sequentially disposed in a line, and
wherein the controller controls the transmission and reception timing of the first to fourth ultrasonic sensors such that a transmission and reception operation of the first ultrasonic sensor, a transmission and reception operation of the fourth ultrasonic sensor, a transmission and reception operation of the second ultrasonic sensor, a reception operation of the first ultrasonic sensor, a reception operation of the third ultrasonic sensor, a transmission and reception operation of the third ultrasonic sensor, a reception operation of the fourth ultrasonic sensor, and a reception operation of the second ultrasonic sensor are sequentially performed.

10. The apparatus of claim 1, wherein the plurality of sensors comprises a plurality of radar sensors, each of which transmits a radar signal and receives a radar signal reflected from the object, and
wherein the controller:

determines at least one of direct detecting or indirect detecting of the object, based on each of a radar signals transmitted from and received by the plurality of a radar sensors, calculates a direct distance value and an indirect distance value if the object is directly or indirectly detected according to a determination result of the radar sensors, and determines that the object exists in the short-range area if at least one of the calculated direct distance value or indirect distance value is equal to or smaller than the distance determination reference value.

11. The apparatus of claim 10, wherein, if the object is directly and indirectly detected according to the determination result of the radar sensors, the controller compares a size of a radar direct reception signal and a size of a radar indirect reception signal with a preset radar direct signal reference and a preset radar indirect signal reference, respectively, and wherein, if the size of the radar direct reception signal and the size of the radar indirect reception signal are larger than the preset radar direct signal reference and the radar indirect signal reference, respectively, based on the comparison result, the controller calculates the direct distance value and the indirect distance value.

12. The apparatus of claim 11, wherein a maximum value of the preset radar direct signal reference is smaller than a maximum value of the preset radar indirect signal reference, and wherein a maintenance time of the maximum value of the preset radar direct signal reference is shorter than a maintenance time of the maximum value of the preset radar indirect signal reference.

13. A method of controlling a vehicle based, the method comprising:

capturing sensing data and processing the captured sensing data by a plurality of sensors mounted to the vehicle to have a field of view of an exterior of the vehicle;

recognizing a type of the sensing data comprising at least one piece of direct sensing data or indirect sensing data from a processing result of the sensing data;

comparing a distance value acquired by the processing result of the sensing data of which the type is recognized with a preset distance determination reference value;

determining whether there is an object located in a particular area according to a comparison result;

searching for a parking area around the vehicle according to a determination result of the object; and performing control regarding a behavior of a control of the vehicle based on the searched parking area, wherein the plurality of sensors comprises a plurality of ultrasonic sensors, each of which transmits an ultrasonic signal and receives an ultrasonic signal reflected from the object, wherein the recognizing a type of the sensing data comprises determining at least one of direct detecting or indirect detecting of the object, based on each of ultrasonic signals transmitted from and received by the plurality of ultrasonic sensors, wherein the comparing a distance value comprises calculating a direct distance value and an indirect distance value if the object is directly and indirectly detected according to a determination result of the plurality of ultrasonic sensors, and wherein the determining of whether there is the object located in the particular area comprises determining that the object exists in a short-range area if at least one of the calculated direct distance value or indirect distance value is equal to or smaller than the distance determination reference value, wherein the comparing a distance value comprises:

if the object is directly and indirectly detected according to the determination result the plurality of ultrasonic sensors, comparing a size of an ultrasonic direct reception signal and a size of an ultrasonic indirect reception signal with a preset ultrasonic direct signal reference and a preset ultrasonic indirect signal reference, respectively; and if the size of the ultrasonic direct reception signal and the size of the ultrasonic indirect reception signal are larger than the preset ultrasonic direct signal reference and the ultrasonic indirect signal reference, respectively, calculating the direct distance value and the indirect distance value.

14. The method of claim 13, wherein the recognizing a type of the sensing data comprises recognizing the direct sensing data and the indirect sensing data, and wherein the determining whether there is an object located in a particular area comprises, if at least one of the direct distance value acquired by a processing result of the direct sensing data or the indirect distance value acquired by a processing result of the indirect sensing data is equal to or smaller than the distance determination reference value, determining that the object exists in the short-range area.

15. The method of claim 13, wherein the recognizing a type of the sensing data comprises recognizing the direct sensing data and the indirect sensing data, and wherein the determining whether there is an object located in a particular area comprises, if at least one of the direct distance value acquired by a processing result of the direct sensing data or the indirect distance value acquired by a processing result of the indirect sensing data is larger than the distance determination reference value, determining that the object exists in a long-range area.

16. The method of claim 13, wherein the recognizing a type of the sensing data comprises recognizing one of the direct sensing data and the indirect sensing data, and wherein the determining of whether there is the object located in the particular area comprises, if a distance value acquired by a processing result of one of the direct sensing data and the indirect sensing data is equal to or smaller than the distance determination reference value, determining that the object does not exist.

17. The method of claim 13, wherein the recognizing a type of the sensing data comprises recognizing one of the direct sensing data and the indirect sensing data, and wherein the determining of whether there is the object located in the particular area comprises, if a distance value acquired by a processing result of one of the direct sensing data and the indirect sensing data is larger than the distance determination reference value, determining that the object exists in a long-range area.

18. The method of claim 13, wherein a maximum value of the preset ultrasonic direct signal reference is smaller than a maximum value of the preset ultrasonic indirect signal reference, and wherein a maintenance time of the maximum value of the preset ultrasonic direct signal reference is shorter than a maintenance time of the maximum value of the preset ultrasonic indirect signal reference.

19. The method of claim 13, wherein the plurality of sensors comprises first to fourth ultrasonic sensors, each of which transmits an ultrasonic signal and receives an ultrasonic signal reflected from the object, wherein the recognizing a type of the sensing data comprises:

controlling a transmission and reception timing of the first to fourth ultrasonic sensors; and determining at least one of direct detecting or indirect detecting of the object, based on each of ultrasonic signals transmitted from and received by the first to fourth ultrasonic sensors, wherein the comparing a distance value comprises calculating a direct distance value and an indirect distance value if the object is directly and indirectly detected according to a determination result of the first to fourth ultrasonic sensors, and wherein the determining of whether there is the object located in the particular area comprises determining that the object exists in the short-range area if at least one of the calculated direct distance value or indirect distance value is equal to or smaller than the distance determination reference value.

20. The method of claim 19, wherein the transmission and reception timing of the first to fourth ultrasonic sensors is controlled such that a transmission and reception operation of the first ultrasonic sensor, a transmission and reception operation of the fourth ultrasonic sensor, a transmission and reception operation of the second ultrasonic sensor, a reception operation of the first ultrasonic sensor, a reception operation of the third ultrasonic sensor, a transmission and reception operation of the third ultrasonic sensor, a reception operation of the fourth ultrasonic sensor, and a reception operation of the second ultrasonic sensor are sequentially performed.

\* \* \* \* \*